US008619881B2

(12) United States Patent
Schoenblum

(10) Patent No.: US 8,619,881 B2
(45) Date of Patent: Dec. 31, 2013

(54) ESTIMATION OF TEMPORAL DEPTH OF 3D OVERLAPPED TRANSFORMS IN VIDEO DENOISING

(75) Inventor: Joel W. Schoenblum, Alpharetta, GA (US)

(73) Assignee: Cisco Technology, Inc.

( * ) Notice: Subject to any disclaimer, the term of this patent is extended or adjusted under 35 U.S.C. 154(b) by 569 days.

(21) Appl. No.: 12/479,147

(22) Filed: Jun. 5, 2009

(65) Prior Publication Data
US 2010/0309990 A1  Dec. 9, 2010

(51) Int. Cl.
*H04N 11/02* (2006.01)
(52) U.S. Cl.
USPC ............. 375/240.29; 375/240.18; 375/240.26
(58) Field of Classification Search
USPC ........................................ 375/240.01–240.29
See application file for complete search history.

(56) References Cited

U.S. PATENT DOCUMENTS

| 4,698,672 | A * | 10/1987 | Chen et al. ............... 375/240.12 |
| 6,442,203 | B1 | 8/2002 | Demos |
| 6,735,342 | B2 * | 5/2004 | Felts et al. ..................... 382/240 |
| 6,754,234 | B1 * | 6/2004 | Wiesner et al. ............... 370/503 |
| 6,801,573 | B2 * | 10/2004 | Zheng ....................... 375/240.11 |
| 7,206,459 | B2 | 4/2007 | Berkner et al. |
| 2002/0196857 | A1 | 12/2002 | Kono et al. |
| 2003/0128761 | A1 | 7/2003 | Zhou |
| 2005/0078872 | A1 | 4/2005 | Samadani et al. |
| 2005/0094893 | A1 | 5/2005 | Samadani |
| 2005/0100235 | A1 | 5/2005 | Kong et al. |
| 2005/0100236 | A1 | 5/2005 | Kong et al. |
| 2005/0100237 | A1 | 5/2005 | Kong et al. |
| 2005/0100241 | A1 | 5/2005 | Kong et al. |
| 2006/0039624 | A1 | 2/2006 | Kong et al. |
| 2006/0056724 | A1 | 3/2006 | Le Dinh et al. |
| 2006/0245497 | A1 | 11/2006 | Tourapis et al. |
| 2007/0041448 | A1 | 2/2007 | Miller et al. |
| 2008/0055477 | A1 | 3/2008 | Wu et al. |
| 2008/0123740 | A1 | 5/2008 | Ye |
| 2008/0253457 | A1 | 10/2008 | Moore |
| 2009/0238535 | A1 | 9/2009 | Robertson et al. |
| 2009/0327386 | A1 | 12/2009 | Schoenblum et al. |
| 2010/0020880 | A1 | 1/2010 | Susnow et al. |
| 2010/0091862 | A1 | 4/2010 | Kuo et al. |
| 2010/0309377 | A1 | 12/2010 | Schoenblum et al. |
| 2010/0309379 | A1 | 12/2010 | Schoenblum et al. |

(Continued)

FOREIGN PATENT DOCUMENTS

| EP | 0 762 738 A2 | 3/1997 |
| WO | WO 91/08547 | 6/1991 |

OTHER PUBLICATIONS

International Search Report and Written Opinion dated Aug. 24, 2010 cited in Application No. PCT/US2010/0037189.

(Continued)

*Primary Examiner* — David Czekaj
*Assistant Examiner* — Leron Beck
(74) *Attorney, Agent, or Firm* — Merchant & Gould

(57) ABSTRACT

In one method embodiment, forward transforming a set of co-located blocks corresponding to plural matched frames; computing a difference measure for a subset of coefficients between a set of transformed blocks and a reference block, the computation in a two-dimensional (2D) transform domain; and selectively thresholding one or more of the co-located transformed blocks based on the number of transformed blocks having a difference measure below a predetermined threshold.

20 Claims, 21 Drawing Sheets

(56) References Cited

U.S. PATENT DOCUMENTS

| | | |
|---|---|---|
| 2010/0309979 A1 | 12/2010 | Schoenblum et al. |
| 2010/0309989 A1 | 12/2010 | Schoenblum et al. |
| 2010/0309991 A1 | 12/2010 | Schoenblum et al. |
| 2010/0316129 A1 | 12/2010 | Zhao et al. |
| 2011/0298984 A1 | 12/2011 | Schoenblum |
| 2011/0298986 A1 | 12/2011 | Schoenblum |
| 2011/0299781 A1 | 12/2011 | Schoenblum |

OTHER PUBLICATIONS

Dabov et al., "Video Denoising by Sparse 3D Transform-Domaincollaborative Filtering," Processing Conference, Sep. 7, 2007, pp. 1-5, XP002596106.

Magarey et al., "Robust motion estimation using chrominance information in colour image sequences," In: "Lecture Notes in Computer Science," Dec. 31, 1997, Springer, vol. 1310/97, pp. 486-493, XP002596107.

Pizurica et al., "Noise reduction in video sequences using wavelet-domain and temporal filtering," Proceedings of SPIE, vol. 5266 Feb. 27, 2004, pp. 1-13, XP002596108.

Kostadin Dabov et al., "Image denoising by sparse 3D transform-domain collaborative filtering", Aug. 2007, vol. 16, No. 8, pp. 1-16.

Kostadin Dabov et al., "Color image denoising via sparse 3D collaborative filtering with grouping constraint in luminance-chrominance space", Jul. 2007, pp. I-313 to I-316.

Dmytro Rusanovskyy et al., "Video denoising algorithm in sliding 3D DCT domain", ACIVS 2005, Antwerp, Belgium, 8 pages total.

Kostadin Dabov et al., "Video denoising by sparse 3D transform-domain collaborative filtering", Sep. 2007, European Signal Processing Conference, Poznan, Poland, 5 pages total.

Dmytro Rusanovskyy, et al., "Moving-window varying size 3D transform-based video denoising", VPQM'06, Scottdale, USA 2006, pp. 1-4.

Steve Gordon et al., "Simplified Use of 8×8 Transforms-Updated Proposal & Results", Joint Video Team (JVT) of ISO/IEC MPEG & ITU-T VCEG (ISO/IEC JTC1/SC29/WG11 and ITU-T SG16 Q.6, Mar. 2004, Munich, Germany, pp. 1-17.

U.S. Appl. No. 12/146,369, filed Jun. 25, 2008 entitled "Combined Deblocking and Denoising Filter", Joel Schoenblum.

U.S. Appl. No. 12/479,018, filed Jun. 5, 2009, entitled "Out of Loop Frame Matching in 3D-Based Video Denoising", Inventor: Joe Schoenblum.

U.S. Appl. No. 12/479,065, filed Jun. 5, 2009, entitled "Consolidating Prior Temporally-Matched Frames in 3D-Based Video Denoising", Inventor: Joe Schoenblum.

U.S. Appl. No. 12/479,104, filed Jun. 5, 2009, entitled "Efficient Spatial and Temporal Transform-Based Video Preprocessing", Inventor: Joe Schoenblum.

U.S. Appl. No. 12/479,194, filed Jun. 5, 2009, entitled "Adaptive Thresholding of 3D Transform Coefficients for Video Denoising", Inventor: Joe Schoenblum.

U.S. Appl. No. 12/479,244, filed Jun. 5, 2009, entitled "Motion Estimation for Noisy Frames Based on Block Matching of Filtered Blocks", Inventor: Joe Schoenblum.

U.S. Appl. No. 12/791,941, filed Jun. 2, 2010, entitled "Preprocessing of Interlaced Video With Overlapped 3D Transforms", Inventor: Joe Schoenblum.

U.S. Appl. No. 12/791,970, filed Jun. 2, 2010, entitled "Scene Change Detection and Handling for Preprocessing Video With Overlapped 3D Transforms", Inventor: Joe Schoenblum.

U.S. Appl. No. 12/791,987, filed Jun. 2, 2010, entitled "Staggered Motion Compensation for Preprocessing Video With Overlapped 3D Transforms", Inventor: Joe Schoenblum.

International Search Report dated Dec. 4, 2009 cited in Application No. PCT/US2009/048422.

T. Kasezawa, "Blocking artifacts reduction using discrete cosine transform", in IEEE Transactions on Consumer Electronics, pp. 48-55, New York: Institute of Electrical and Electronics Engineers, vol. 43, No. 1, Feb. 1997.

Y. Nie et al., "Fast adaptive fuzzy post-filtering for coding artifacts removal in interlaced video", in IEEE International Conference on Acoustics, Speech, and Signal Processing, pp. ii/993-ii/996, New York: Institute of Electrical and Electronics Engineers, vol. 2, Mar. 2005.

A. Nosratinia, "Denoising JPEG images by re-application of JPEG", in 1998 IEEE Second Workshop on Multimedia Signal Processing, pp. 611-615, New York: Institute of Electrical and Electronics Engineers, Dec. 1998.

R. Samadani et al., "Deringing and deblocking DCT compression artifacts with efficient shifted transforms", in 2004 International Conference on Image Processing, pp. 1799-1802, Piscataway, New Jersey: Institute of Electrical and Electronics Engineers, vol. 3, No. Oct. 2004.

C. Wu et al., "Adaptive postprocessors with DCT-based block classifications", in IEEE Transactions on Circuits and Systems for Video Technology, pp. 365-375, New York: Institute of Electrical and Electronics Engineers, vol. 13, No. 5, May 2003.

J. Canny, "A computational approach to edge detection", in IEEE Trans Pattern Analysis and Machine Intelligence, pp. 679-698, Washington D.C.: IEEE Computer Society, vol. 8, No. 6, Nov. 1986.

P. Dragotti et al., "Discrete directional wavelet bases for image compression", Visual Communications and Image Processing, Jul. 2003, Proceedings of SPIE, vol. 5150, pp. 1287-1295.

G. Triantafyllidis et al., "Blocking artifact detection and reduction in compressed data", in IEEE Transactions on Circuits and Systems for Video Technology, pp. 877-890, New York: Institute of Electricl and Electronics Engineers, vol. 12, No. 10, Oct. 2002.

Huang et al., "Predictive subband image coding with wavelet transform", Signal Processing: Image Communication, vol. 13, No. 3, Sep. 1998, pp. 171-181.

Marpe et al., "H.264/MPEG4-AVC Fidelity Range Extensions: Tools, Profiles, Performance, and Application Areas," IEEE Conference on Image Processing, Nov. 14, 2005, 4 pages.

U.S. Non-Final Office Action mailed Oct. 11, 2011 in U.S. Appl. No. 12/479,018.

U.S. Non-Final Office Action mailed Oct. 20, 2011 in U.S. Appl. No. 12/479,194.

U.S. Non-Final Office Action mailed Nov. 23, 2011 in U.S. Appl. No. 12/479,244.

European Office Action dated Nov. 15, 2011 cited in Appl. No. 09 770 924.01, 4 pgs.

* cited by examiner

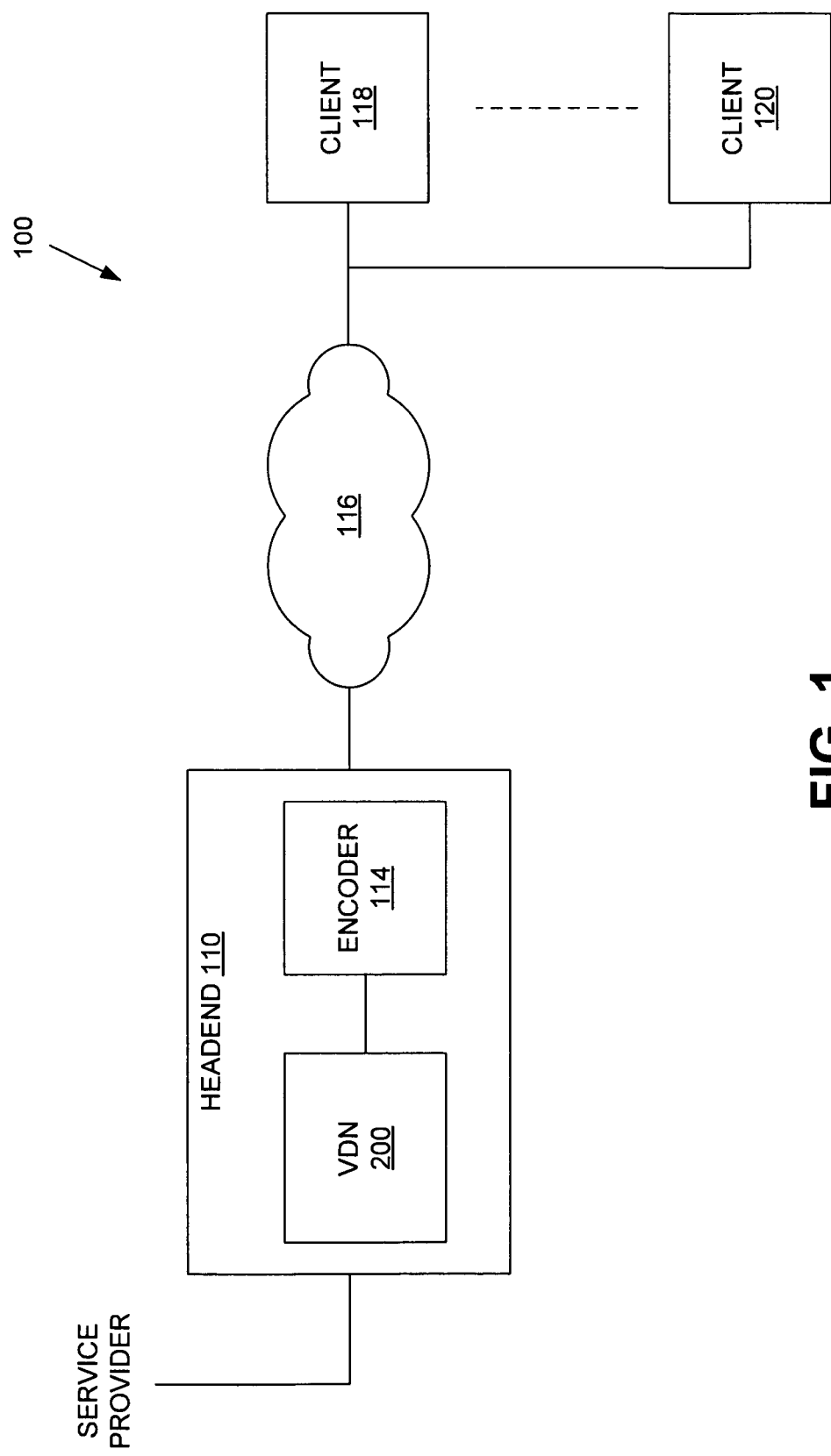

ESTIMATION OF TEMPORAL DEPTH OF 3D OVERLAPPED TRANSFORMS IN VIDEO DENOISING

TECHNICAL FIELD

The present disclosure relates generally to video noise reduction.

BACKGROUND

Filtering of noise in video sequences is often performed to obtain as close to a noise-free signal as possible. Spatial filtering requires only the current frame (i.e. picture) to be filtered and not surrounding frames in time. Spatial filters, when implemented without temporal filtering, may suffer from blurring of edges and detail. For this reason and the fact that video tends to be more redundant in time than space, temporal filtering is often employed for greater filtering capability with less visual blurring. Since video contains both static scenes and objects moving with time, temporal filters for video include motion compensation from frame to frame for each part of the moving objects to prevent trailing artifacts of the filtering.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIG. 1 is a block diagram that illustrates an example environment in which video denoising (VDN) systems and methods can be implemented.

DESCRIPTION OF EXAMPLE EMBODIMENTS

Overview

Figure 2A:
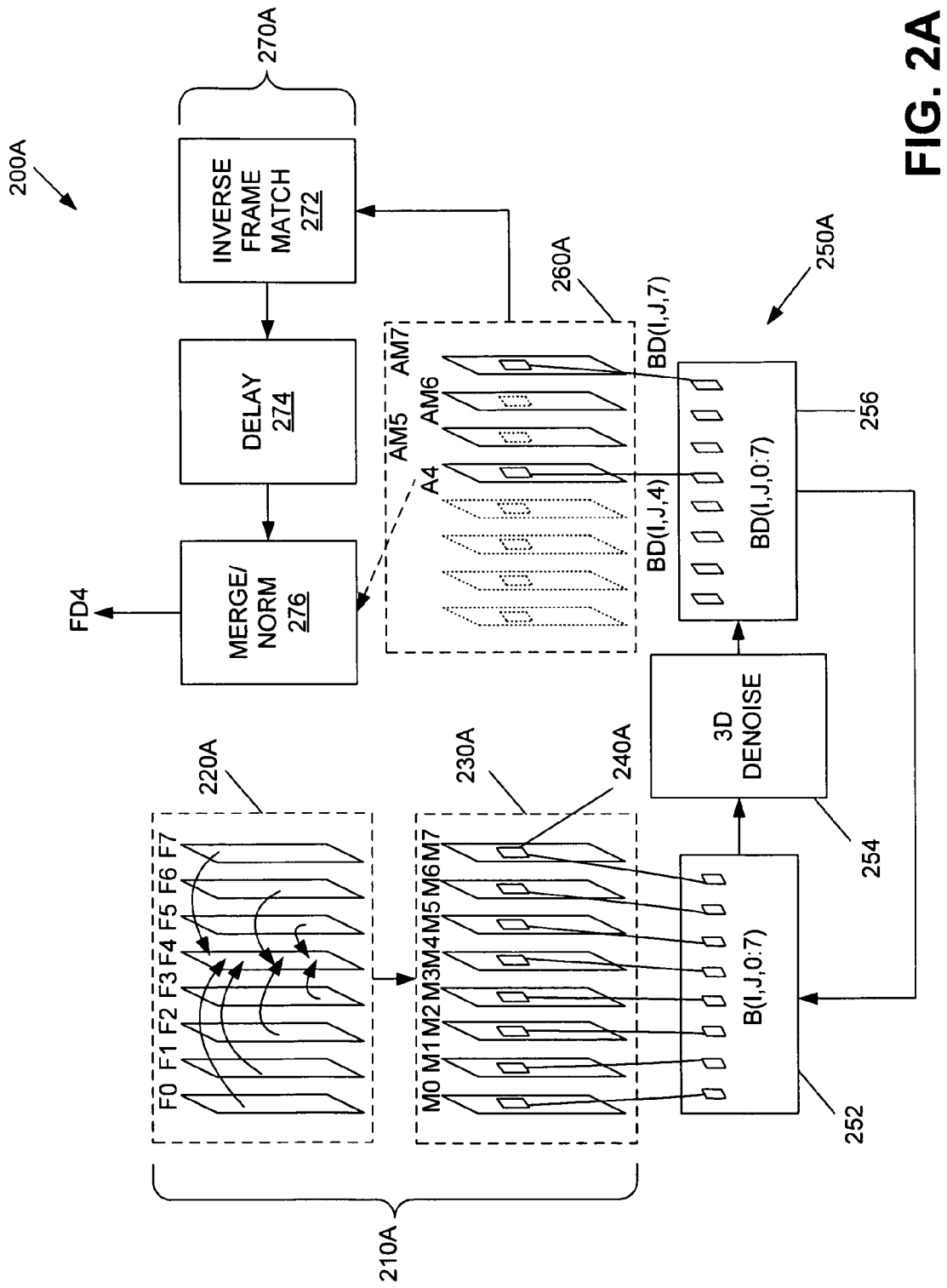
FIGS. 2A-2C are schematic diagrams that conceptually illustrate processing implemented by various example embodiments of VDN systems and methods.

In one method embodiment, forward transforming a set of co-located blocks corresponding to plural matched frames; computing a difference measure for a subset of coefficients between a set of transformed blocks and a reference block, the computation in a two-dimensional (2D) transform domain; and selectively thresholding one or more of the co-located transformed blocks based on the number of transformed blocks having a difference measure below a predetermined threshold.

Example Embodiments

Disclosed herein are various example embodiments of video denoising (VDN) systems and methods (collectively, referred to herein also as a VDN system or VDN systems) that comprise a frame alignment module and an overlapped block processing module, the overlapped block processing module configured to denoise video in a three-dimensional (3D) transform domain using motion compensated overlapped 3D transforms. In particular, certain embodiments of VDN systems motion compensate a set of frames surrounding a current frame, and denoise the frame using 3D spatio-temporal transforms with thresholding of the 2D and/or 3D transform coefficients. One or more VDN system embodiments provide several advantages or distinctive features over brute force methods of conventional systems, including significantly reduced computational complexity that enable implementation in real-time silicon (e.g., applicable to real-time applications, such as pre-processing of frames for real-time broadcasting of encoded pictures of a video stream), such as non-programmable or programmable hardware including field programmable gate arrays (FPGAs), and/or other such computing devices. Several additional distinctive features and/or advantages, explained further below, include the decoupling of block matching and inverse block matching from an overlapped block processing loop, reduction of accumulation buffers from 3D to 2D+n (where n is an integer number of accumulated frames less than the number of frames in a 3D buffer), and the "collapsing" of frames (e.g., taking advantage of the fact that neighboring frames have been previously frame matched to reduce the amount of frames entering the overlapped block processing loop while obtaining the benefit of the information from the full scope of frames from which the reduction occurred for purposes of denoising). Such features and/or advantages enable substantially reduced complexity block matching. Further distinctive features include, among others, a customized-temporal transform and temporal depth mode selection, also explained further below.

These advantages and/or features, among others, are described hereinafter in the context of an example subscriber television network environment, with the understanding that other video environments may also benefit from certain embodiments of the VDN systems and methods and hence are contemplated to be within the scope of the disclosure. It should be understood by one having ordinary skill in the art that, though specifics for one or more embodiments are disclosed herein, such specifics as described are not necessarily part of every embodiment.

FIG. 1 is a block diagram of an example environment, a subscriber television network 100, in which certain embodiments of VDN systems and/or methods may be implemented. The subscriber television network 100 may include a plurality of individual networks, such as a wireless network and/or a wired network, including wide-area networks (WANs), local area networks (LANs), among others. The subscriber television network 100 includes a headend 110 that receives (and/or generates) video content, audio content, and/or other content (e.g., data) sourced at least in part from one or more service providers, processes and/or stores the content, and delivers the content over a communication medium 116 to one or more client devices 118 through 120. The headend 110 comprises an encoder 114 having video compression functionality, and a pre-processor or VDN system 200 configured to receive a raw video sequence (e.g., uncompressed video frames or pictures), at least a portion of which (or the entirety) is corrupted by noise. Such noise may be introduced via camera sensors, from previously encoded frames (e.g., artifacts introduced by a prior encoding process from which the raw video was borne, among other sources). The VDN system 200 is configured to denoise each picture or frame of the video sequence and provide the denoised pictures or frames to the encoder 114, enabling, among other benefits, the encoder to encode fewer bits than if noisy frames were inputted to the encoder. In some embodiments, at least a portion of the raw video sequence may bypass the VDN system 200 and be fed directly into the encoder 114.

Throughout the disclosure, the terms pictures and frames are used interchangeably. In some embodiments, the uncompressed video sequences may be received in digitized format, and in some embodiments, digitization may be performed in the VDN system 200. In some embodiments, the VDN system 200 may comprise a component that may be physically and/or readily de-coupled from the encoder 114 (e.g., such as in the form of a plug-in-card that fits in a slot or receptacle of the encoder 114). In some embodiments, the VDN system 200 may be integrated in the encoder 114 (e.g., such as integrated in an applications specific integrated circuit or ASIC). Although described herein as a pre-processor to a headend component or device, in some embodiments, the VDN system 200 may be co-located with encoding logic at a client device, such as client device 118, or positioned elsewhere within a network, such as at a hub or gateway.

The headend 110 may also comprise other components, such as QAM modulators, routers, bridges, Internet Service Provider (ISP) facility servers, private servers, on-demand servers, multi-media messaging servers, program guide servers, gateways, multiplexers, and/or transmitters, among other equipment, components, and/or devices well-known to those having ordinary skill in the art. Communication of Internet Protocol (IP) packets between the client devices 118 through 120 and the headend 110 may be implemented according to one or more of a plurality of different protocols, such as user datagram protocol (UDP)/IP, transmission control protocol (TCP)/IP, among others.

In one embodiment, the client devices 118 through 120 comprise set-top boxes coupled to, or integrated with, a display device (e.g., television, computer monitor, etc.) or other communication devices and further coupled to the communication medium 116 (e.g., hybrid-fiber coaxial (HFC) medium, coaxial, optical, twisted pair, etc.) via a wired connection (e.g., via coax from a tap) or wireless connection (e.g., satellite). In some embodiments, communication between the headend 110 and the client devices 118 through 120 comprises bi-directional communication over the same transmission medium 116 by which content is received from the headend 110, or via a separate connection (e.g., telephone connection). In some embodiments, communication medium 116 may comprise of a wired medium, wireless medium, or a combination of wireless and wired media, including by way of non-limiting example Ethernet, token ring, private or proprietary networks, among others. Client devices 118 through 120 may henceforth comprise one of many devices, such as cellular phones, personal digital assistants (PDAs), computer devices or systems such as laptops, personal computers, set-top terminals, televisions with communication capabilities, DVD/CD recorders, among others. Other networks are contemplated to be within the scope of the disclosure, including networks that use packets incorporated with and/or compliant to other transport protocols or standards.

The VDN system 200 may be implemented in hardware, software, firmware, or a combination thereof. To the extent certain embodiments of the VDN system 200 or a portion thereof are implemented in software or firmware, executable instructions for performing one or more tasks of the VDN system 200 are stored in memory or any other suitable computer readable medium and executed by a suitable instruction execution system. In the context of this document, a computer readable medium is an electronic, magnetic, optical, or other physical device or means that can contain or store a computer program for use by or in connection with a computer related system or method.

To the extent certain embodiments of the VDN system 200 or a portion thereof are implemented in hardware, the VDN system 200 may be implemented with any or a combination of the following technologies, which are all well known in the art: a discrete logic circuit(s) having logic gates for implementing logic functions upon data signals, an application specific integrated circuit (ASIC) having appropriate combinational logic gates, programmable hardware such as a programmable gate array(s) (PGA), a field programmable gate array (FPGA), etc.

Figure 2B:
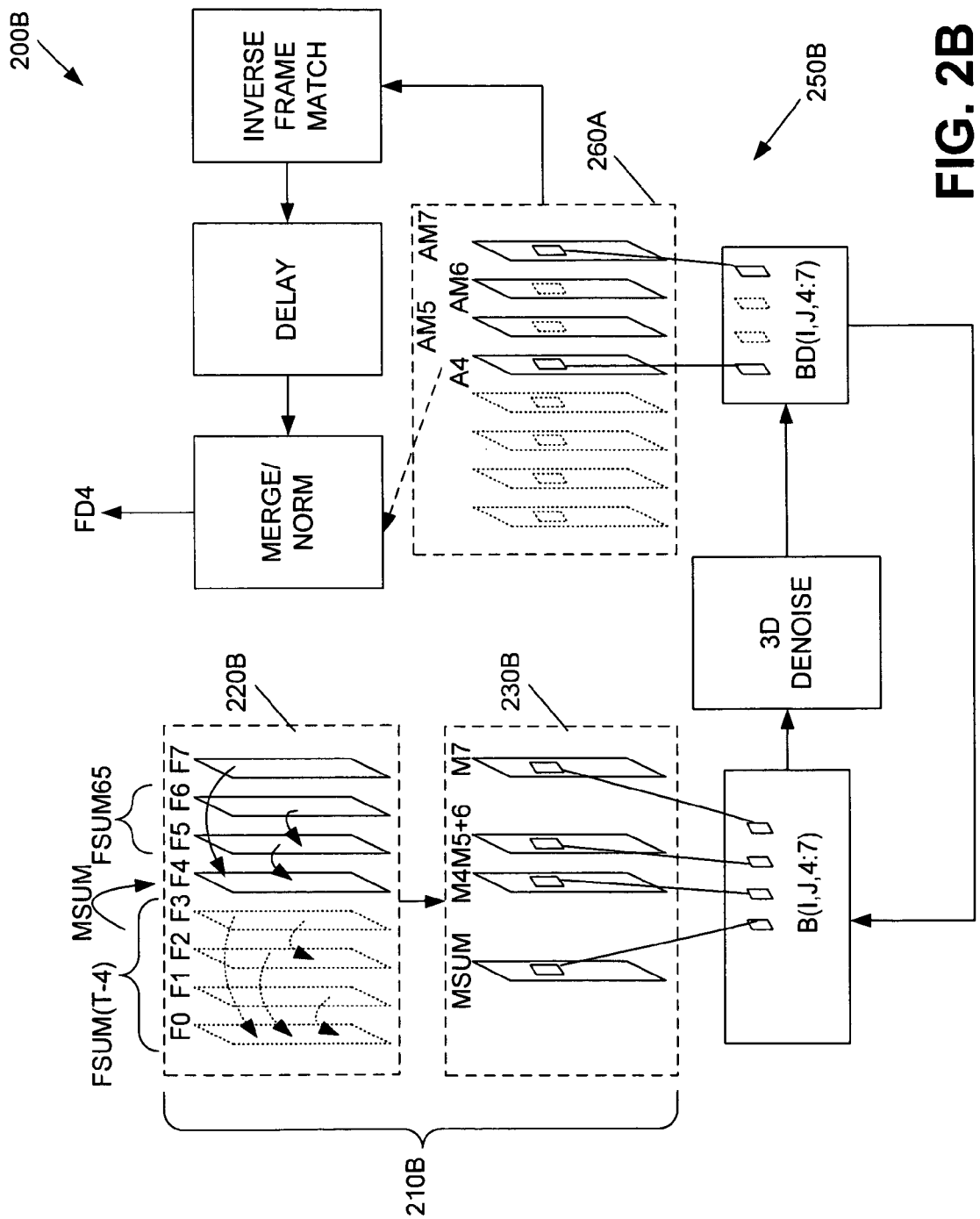
Figure 2C:
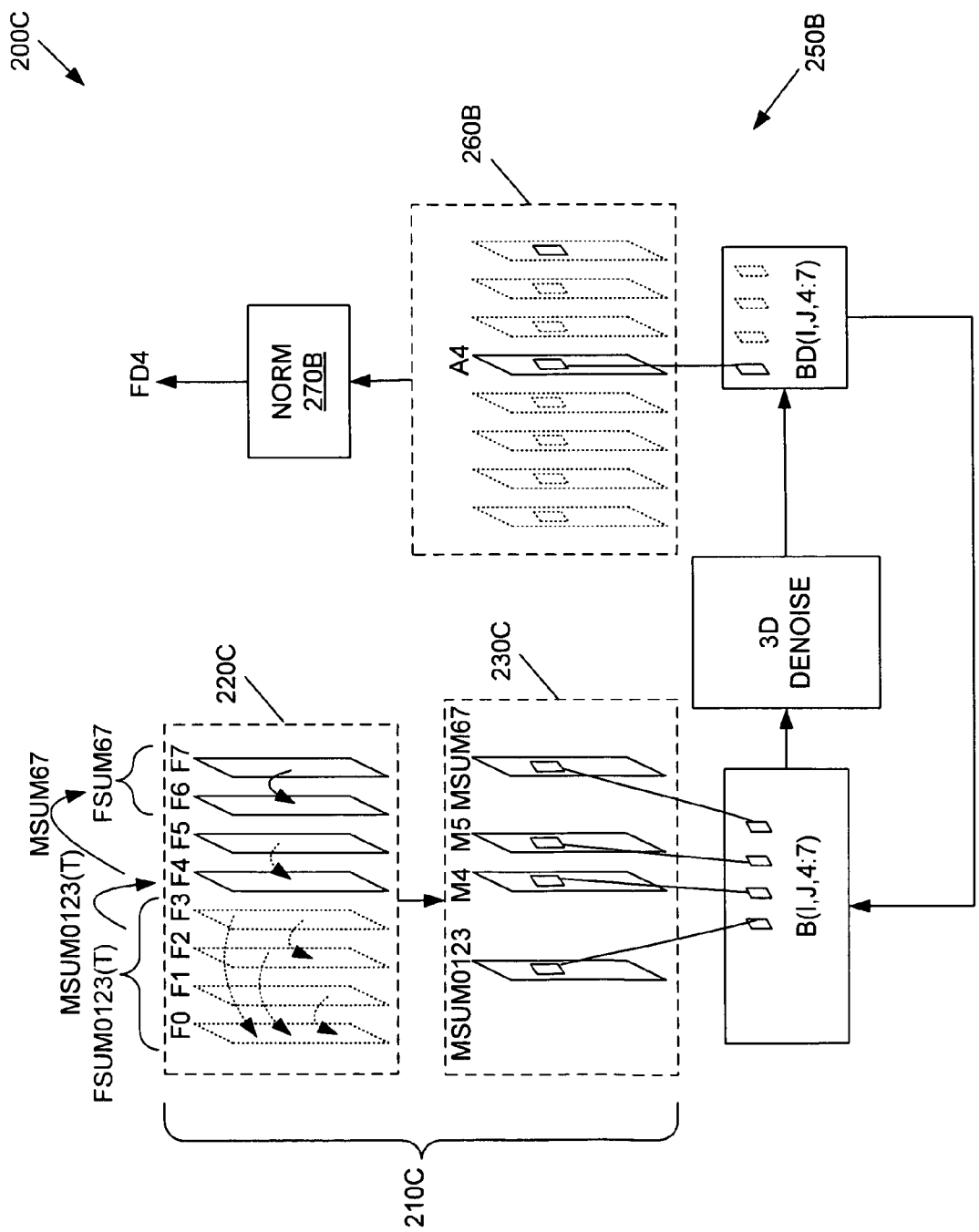

Having described an example environment in which the VDN system 200 may be employed, attention is directed to FIGS. 2A-2C, which comprise schematic diagrams that conceptually illustrate data flows and/or processing implemented by various example embodiments of VDN systems and methods. Progressing from FIG. 2A to FIG. 2B and then to FIG. 2C represents a reduction in processing complexity, and hence like-processing throughout these three figures are denoted with the same numerical reference and an alphabetical or alphanumeric suffix (e.g., a, b, and c, or a-1, etc.) that may change from each figure for a given component or diagram depending on whether there is a change or reduction in complexity to the component or represented system 200. Further, each "F" (e.g., F0, F1, etc.) shown above component 220a in FIG. 2A (and likewise shown and described in association with other figures) is used to denote frames that have not yet been matched to the reference frame (F4), and each "M" (e.g., M0, M1, etc.) is used to denote frames that have been matched (e.g., to the reference frame). Note that use of the term "component" with respect to FIGS. 2A-2C does not imply that processing is limited to a single electronic component, or that each "component" illustrated in these figures are necessarily separate entities. Instead, the term "component" in these figures graphically illustrates a given process implemented in the VDN system embodiments, and is used instead of "block," for instance, to avoid confusion in the term, block, when used to describe an image or pixel block.

Overall, VDN system embodiment, denoted 200a in FIG. 2A, can be subdivided into frame matching 210a, overlap block processing 250a, and post processing 270a. In frame matching 210a, entire frames are matched at one time (e.g., a single time or single processing stage), and hence do not need to be matched during implementation of overlapped block processing 250a. In other words, block matching in the frame matching process 210a is decoupled (e.g., blocks are matched without block overlapping in the frame matching process) from overlapped block processing 250a, and hence entire frames are matched and completed for a given video sequence before overlapped block processing 250a is commenced for the given video sequence. By decoupling frame matching 210a from overlapped block processing 250a, block matching is reduced by a factor of sixty-four (64) when overlapped block processing 250a has a step size of s=1 pixel in both the vertical and horizontal direction (e.g., when compared to integrating overlapped block processing 250a with the frame matching 210a). If the step size is s=2, then block matching is reduced by a factor of sixteen (16). One having ordinary skill in the art should understand that various step sizes are contemplated to be within the scope of the disclosure, the selection of which is based on factors such as available computational resources and video processing performance (e.g., based on evaluation of PSNR, etc.).

Shown in component 220a are eight (8) inputted contiguous frames, F0(t) through F7(t) (denoted above each symbolic frame as F0, F1, etc.). The eight (8) contiguous frames correspond to a received raw video sequence of plural frames. In other words, the eight (8) contiguous frames correspond to a temporal sequence of frames. For instance, the frames of the raw video sequence are arranged in presentation output order (which may be different than the transmission order of the compressed versions of these frames at the output of the headend 110). In some embodiments, different arrangements of frames and/or different applications are contemplated to be within the scope of the disclosure. Note that quantities fewer or greater than eight frames may be used in some embodiments at the inception of processing. Frame matching (e.g., to FIG. 4) is symbolized in FIGS. 2A-2C by the arrow head lines, such as represented in component 220a (e.g., from F0 to F4, etc.). As illustrated by the arrow head lines, frames F0(t) through F3(t) are matched to F4(t), meaning that blocks (e.g., blocks of pixels or image blocks, such as 8×8, 8×4, etc.) have been selected from those frames which most closely match blocks in F4(t) through a motion estimation/motion compensation process as explained below. The result of frame matching is a set of frames M0(t) through M7(t), where M4(t)=F4(t), as shown in component 230a. Frames M0(t) through M7(t) are all estimates of F4(t), with M4(t)=F4(t) being a perfect match. M4(t) and F4(t) are used interchangeably herein.

Overlapped block processing 250a is symbolically represented with components 252 (also referred to herein as a group of matched noisy blocks or similar), 254 (also referred to herein as 3D denoising or similar), 256 (also referred to as a group or set of denoised blocks or similar), and 260a (also referred to herein as pixel accumulation buffer(s)). Overlapped block processing 250a moves to a pixel location i,j in each of the matched frames (e.g., the same, co-located, or common pixel location), and for each loop, takes in an 8×8 noisy block b(i,j,t) (e.g., 240a) from each matched frame M0 through M7, with the top left corner at pixel position i,j, so that b(i,j,t)=Mt(i:i+7, j:j+7). Note that i,j are vertical and horizontal indices which vary over the entire frame, indicating the position in the overlapped processing loop. For instance, for a step size s=1, i,j takes on every pixel position in the frame (excluding boundaries of 7 pixels). For a step size s=2 i,j takes on every other pixel. Further note that 8×8 is used as an example block size, with the understanding that other block sizes may be used in some embodiments of overlapped block processing 250a. The group of eight (8) noisy 8×8 blocks (252) is also denoted as b(i,j,0:7). Note that the eight (8) noisy blocks b(i,j,0:7) (252) are all taken from the same pixel position i,j in the matched frames, since frame alignment (as part of frame matching processing 210a) is accomplished previously. Frame matching 210a is decoupled from overlapped block processing 250a.

3D denoising 254 comprises forward and inverse transforming (e.g., 2D followed by 1D) and thresholding (e.g., 1D and/or 2D), as explained further below. In general, in 3D denoising 254, a 2D transform is performed on each of the 8×8 noisy blocks (252), followed by a 1D transform across the 2D transformed blocks. After thresholding, the result is inverse transformed (e.g., 1D, then 2D) back to pixel blocks. The result is a set of eight (8) denoised blocks bd(i,j, 0:7) (256).

For each loop, there are eight (8) denoised blocks (256), but in some embodiments, not all of the blocks of bd(i,j, 0:7) are accumulated to the pixel accumulation buffers 260a, as symbolically represented by the frames and blocks residing therein in phantom (dashed lines). Rather, the accumulation buffers 260a comprise what is also referred to herein as 2D+c accumulation buffers 260a, where c represents an integer value corresponding to the number of buffers for corresponding frames of denoised blocks in addition to the buffer for A4. A 2D accumulation buffer corresponds to only A4 (the reference frame) being accumulated using bd(i,j,4) (e.g., denoised blocks bd(i,j,4) corresponding to frame A4 are accumulated). In this example, another buffer corresponding to c=1 is shown as being accumulated, where the c=1 buffer corresponds to denoised blocks bd(i,j,7) corresponding to frame AM7. It follows that for an eight (8) frame window, a 2D+7 accumulation buffer equals a 3D accumulation buffer. Further, it is noted that using a 2D+1 accumulation buffer is analogous in the time dimension to using a step size s=4 in the spatial dimension (i.e. the accumulation is decimated in time). Accordingly, c can be varied (e.g., from 0 to a defined integer) based on the desired visual performance and/or available computational resources. However, in some embodiments, a 3D accumulation buffer comprising denoised pixels from plural overlapped blocks is accumulated for all frames.

In overlapped block processing 250a, blocks bd(i,j,4) and bd(i,j,7) are accumulated in accumulation buffers 260a at pixel positions i,j since the accumulation is performed in the matched-frame domain, circumventing any need for inverse block matching within the overlapped block processing loop 250a. Further, uniform weighting (e.g., w(i,j)=1 or no weighting at all) for all denoised blocks is implemented, which significantly reduces complexity. Note that in some embodiments, non-uniform weighting may be implemented. Note that in some embodiments, buffers for more than two frames (e.g., c>1) may be implemented. For a 2D+1 buffer, a frame begins denoising when it becomes A7, since there is an accumulation buffer for A7 for the 2D+1 accumulation buffer 260a. A7 receives a second ($2^{nd}$) iteration of denoising when it becomes A4. The two are merged as shown in post-processing 270a, as explained further below.

From the accumulation buffers 260a, post processing 270a is implemented, which comprises in one embodiment the processes of inverse frame matching 272 (e.g., as implemented in an inverse frame matching module or logic), delay 274 (e.g., as implemented in a delay module or logic), and merge and normalizing 276 (e.g., as implemented in merge and normalize module or logic). Since in one embodiment the accumulation buffer corresponding to AM7 is in the matched frame domain (e.g., frame 7 matched to frame 4), after the overlapped block processing is completed, data flow advances to inverse frame matching 272 to inverse frame match AM7(*t*) to obtain A7(*t*). As noted, this operation occurs once outside of overlapped block processing 250*a*. A7(*t*) is then delayed (274), in this example, three frames, and merged (added) and normalized 276 to A4(*t*) (as represented by the dotted line arrowhead) to output FD4(*t*), the denoised frame. Had the inverse frame matching 272 been implemented in the overlapped block processing 250*a*, the inverse frame matching would move a factor of sixty-four (64) more blocks than the implementation shown for a step size s=1, or a factor of 16 more for s=2.

Ultimately, after the respective blocks for each accumulated frame have been accumulated from plural iterations of the overlapped block processing 250*a*, the denoised and processed frame FD4 is output to the encoder or other processing devices in some embodiments. As explained further below, a time shift is imposed in the sequence of frames corresponding to frame matching 210*a* whereby one frame (e.g., F0) is removed and an additional frame (not shown) is added for frame matching 210*a* and subsequent denoising according to a second or subsequent temporal frame sequence or temporal sequence (the first temporal sequence associated with the first eight (8) frames (F0-F7) discussed in this example). Accordingly, after one iteration of frame processing (e.g., frame matching 210*a* plus repeated iterations or loops of overlapped block processing 250*a*), as illustrated in the example of FIG. 2A, FD4(*t*) is output as a denoised version of F4(*t*). As indicated above, all of the frames F0(*t*) through F7(*t*) shift one frame (also referred to herein as time-shifted) so that F0(*t*+1)= F1(*t*), F1(*t*+1)=F2(*t*), etc., and a new frame F7(*t*+1) (not shown) enters the "window" (component 220*a*) of frame matching 210*a*. Note that in some embodiments, greater numbers of shifts can be implemented to arrive at the next temporal sequence. Further, F0(*t*) is no longer needed at t+1 so one frame leaves the window (e.g., the quantity of frames outlined in component 220*a*). For the 8-frame case, as one non-limiting example, there is a startup delay of eight (8) frames, and since three (3) future frames are needed to denoise F4(*t*) and F5 through F7, there is general delay of three (3) frames.

Referring now to FIG. 2B, shown is a VDN system embodiment, denoted 200*b*, with further reduced computational complexity compared to the VDN system embodiment 200*a* illustrated in FIG. 2A. The simplification in FIG. 2B is at least partially the result of the 2D+1 accumulation buffers 260*a* and a modified 1D temporal transform, as explained further below. In the above-description of the 2D+1 accumulation buffers 260*a* in FIG. 2A, it is noted that the 2D+1 accumulation buffers 260*a* require only buffers (e.g., two) for denoised blocks, bd(i,j,4) and bd(i,j,7). Accordingly, a further reduction in complexity includes the "collapse" of the left four (4) frames, F0 through F3, into a single summation-frame FSUM, and frame-matching the summation-frame to F4, as illustrated in frame matching 210*b*, and in particular, component 220*b* of FIG. 2B. The collapse to a single summation frame comprises an operation which represents a close approximation to the left-hand side frame matching 210*a* illustrated in FIG. 2A. Since F0 through F3 were previously matched together at time t-4, no matching operations are needed on those individual frames. Instead, frame matching 210*b* matches the sum, FSUM, from time t-4 to F4, where $$FSUM(t-4) = \sum_{j=4}^{7} Mj(t-4) FSUM(t-4) = \sum_{j=4}^{7} Mj(t-4). \quad \text{Eq. (1)}$$

Eq. (1) implies that FSUM(t) is the sum of the four (4) frame-matched F4 through F7 frames, denoted M4(*t*) through M7(*t*) at time t, and is used four (4) frames (t-4) later as the contribution to the left (earliest) four (4) frames in the 3D transforms. A similar type of simplification is made with respect to frames F5 and F6. After the four (4) frames F0 through F3 are reduced to one FSUM frame, and F5 and F6 are reduced to a single frame, and then matched to F4(*t*), there are only four (4) matched frames, MSUM (actually MSUM0123), M4, M5+6, and M7, as noted in component 230*b*, and therefore the entire overlapped block processing 250*b* proceeds using just four (4) (b(i,j,4:7)) matched frames. The number of frames in total that need matching to F4(*t*) is reduced to three (3) in the VDN system embodiment 200*b* of FIG. 2B from seven (7) in the VDN system embodiment 200*a* in FIG. 2A. In other words, overlapped block processing 250*b* receives as input the equivalent of eight (8) frames, hence obtaining the benefit of eight (8) frames using a fewer number of frame estimates.

FIG. 2C is a block diagram of a VDN system embodiment, 200*c*, that illustrates a further reduction in complexity from the system embodiments in FIGS. 2A-2B, with particular emphasis at the accumulation buffers denoted 260*b*. In short, the accumulation buffer 260*b* comprises a 2D accumulation buffer, which eliminates the need for inverse motion compensation and reduces the complexity of the post-accumulating processing 270*b* to a normalization block. In this embodiments, the frames do not need to be rearranged into the frame-matching (e.g., component 220*b*) as described above in association with FIG. 2B. Instead, as illustrated in the frame matching 210*c*, F7 is matched to F6, and the result is added together to obtain FSUM67. F5 is matched to F4 using the motion vectors from two (2) frames earlier (when F5, F4 were positioned in time at F7, F6 respectively), so this manner of frame matching is shown as a dotted line between F4 and F5 in component 220*c* in FIG. 2C. As before, FSUM0123 represents four (4) frames matched, four (4) frames earlier, and summed together. In summary, frame matching 210*c* for the 2D accumulation buffer 260*b* matches three (3) frames to F4: FSUM0123, FSUM67 and F5.

Figure 3:
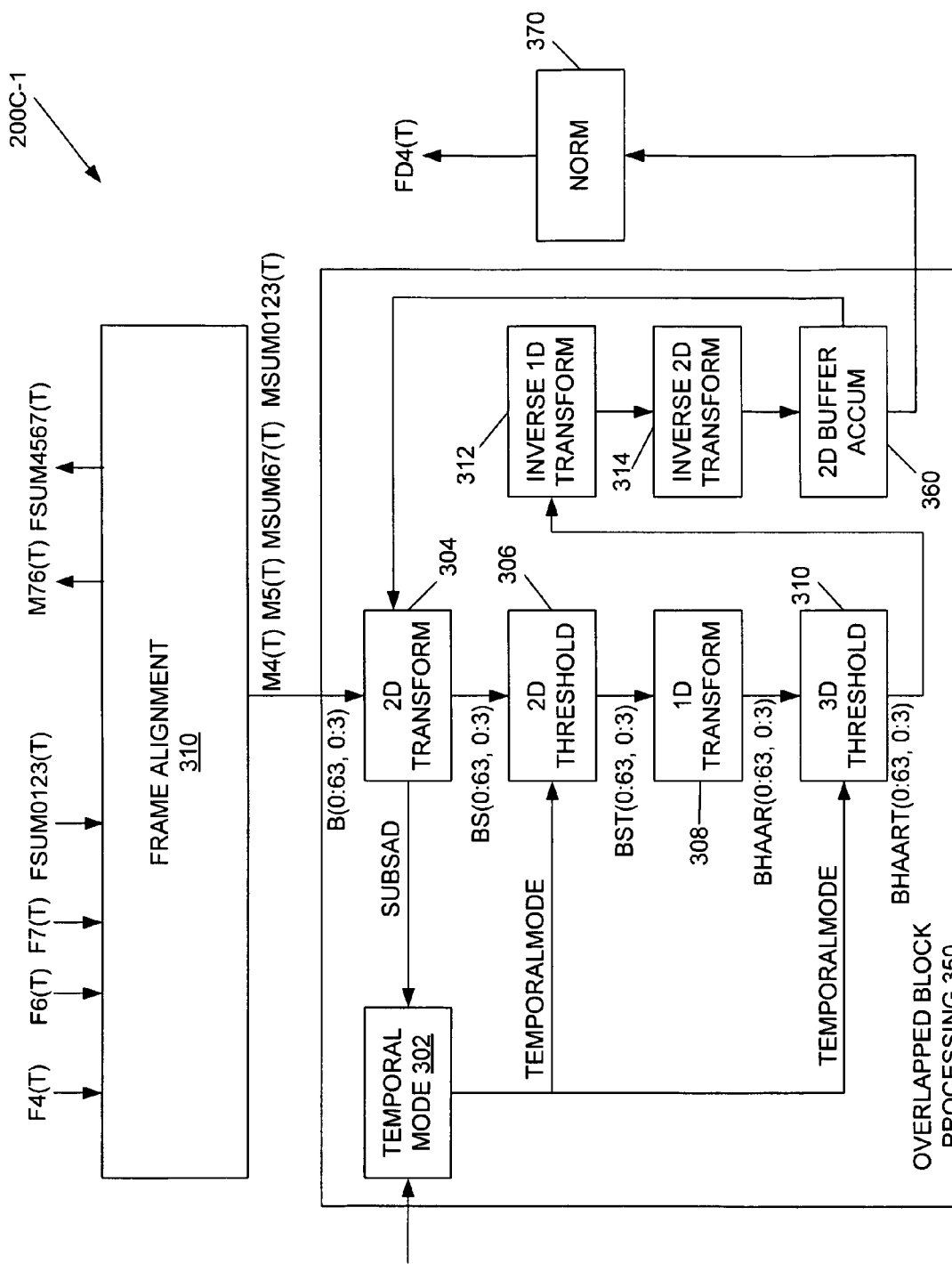
FIG. 3 is a block diagram that illustrates one example VDN system embodiment comprising frame alignment and overlapped block processing modules.

Having described conceptually example processing of certain embodiments of VDN systems 200, attention is now directed to FIG. 3, which comprises a block diagram of VDN system embodiment 200*c*-1. It is noted that the architecture and functionality described hereinafter is based on VDN system embodiment 200*c* described in association with FIG. 2C, with the understanding that similar types of architectures and components for VDN system embodiments 200*a* and 200*b* can be derived by one having ordinary skill in the art based on the teachings of the present disclosure without undue experimentation. VDN system embodiment 200*c*-1 comprises a frame alignment module 310, an overlapped block processing module 350, an accumulation buffer 360, and a normalization module 370 (post-accumulation processing). It is noted that frame processing 250 in FIGS. 2A-2C correspond to the processing implemented by the frame alignment module 310, and overlap block processing 250 corresponds to the processing implemented by the overlapped block processing module 350. In addition, the 2D accumulation buffer 360 and the normalization module 370 implement processing corresponding to the components 260 and 270, respectively, in FIG. 2C. Note that in some embodiments, functionality may be combined into a single component or distributed among more or different modules.

As shown in FIG. 3, the frame alignment module 310 receives plural video frames F4(t), F6(t), and F7(t), where F4(t) is the earliest frame in time, and t is the time index which increments with each frame. The frame FSUM0123(t)=FSUM4567(t-4) represents the first four (4) frames F0(t) through F3(t) (F4(t-4) through F7(t-4)) which have been matched to frame F0(t) (F4(t-4)) previously at time t=t-4. Note that for interlaced video, the frames may be separated into fields and the VDN system embodiment 200c-1 may be run separately (e.g., separate channels, such as top channel and bottom channel) on like-parity fields (e.g., top or bottom), with no coupling, as should be understood by one having ordinary skill in the art in the context of the present disclosure. Throughout this disclosure, the term "frame" is used with the understanding that the frame can in fact be an individual field with no difference in processing. The frame alignment module 310 produces the following frames for processing by the overlapped block processing module 350, the details of which are described below: M4(t), MSUM67(t), M5(t), and MSUM0123(t).

Figure 4A:
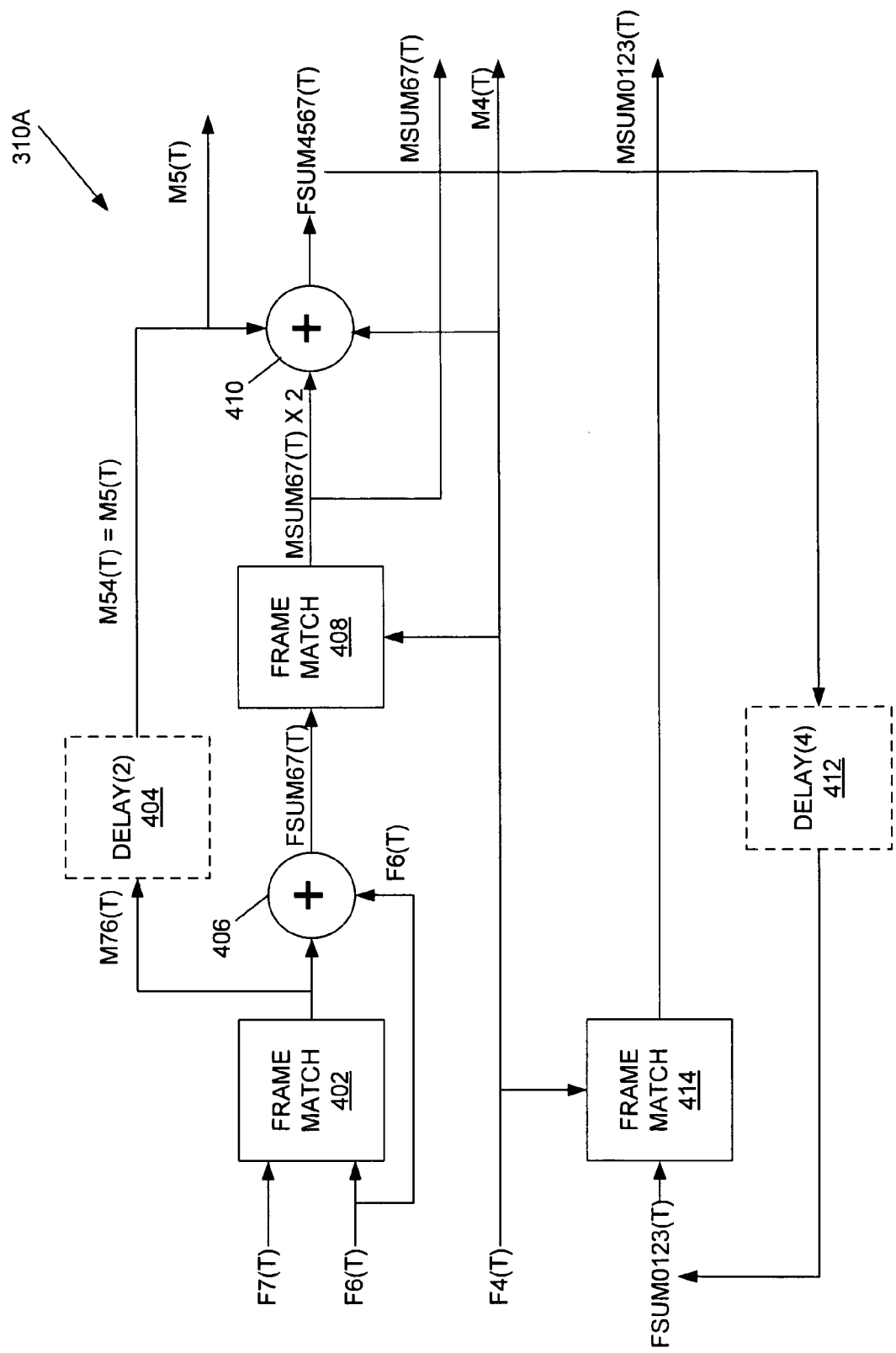
FIG. 4A is a block diagram that illustrates one example embodiment of a frame alignment module.
Figure 4B:
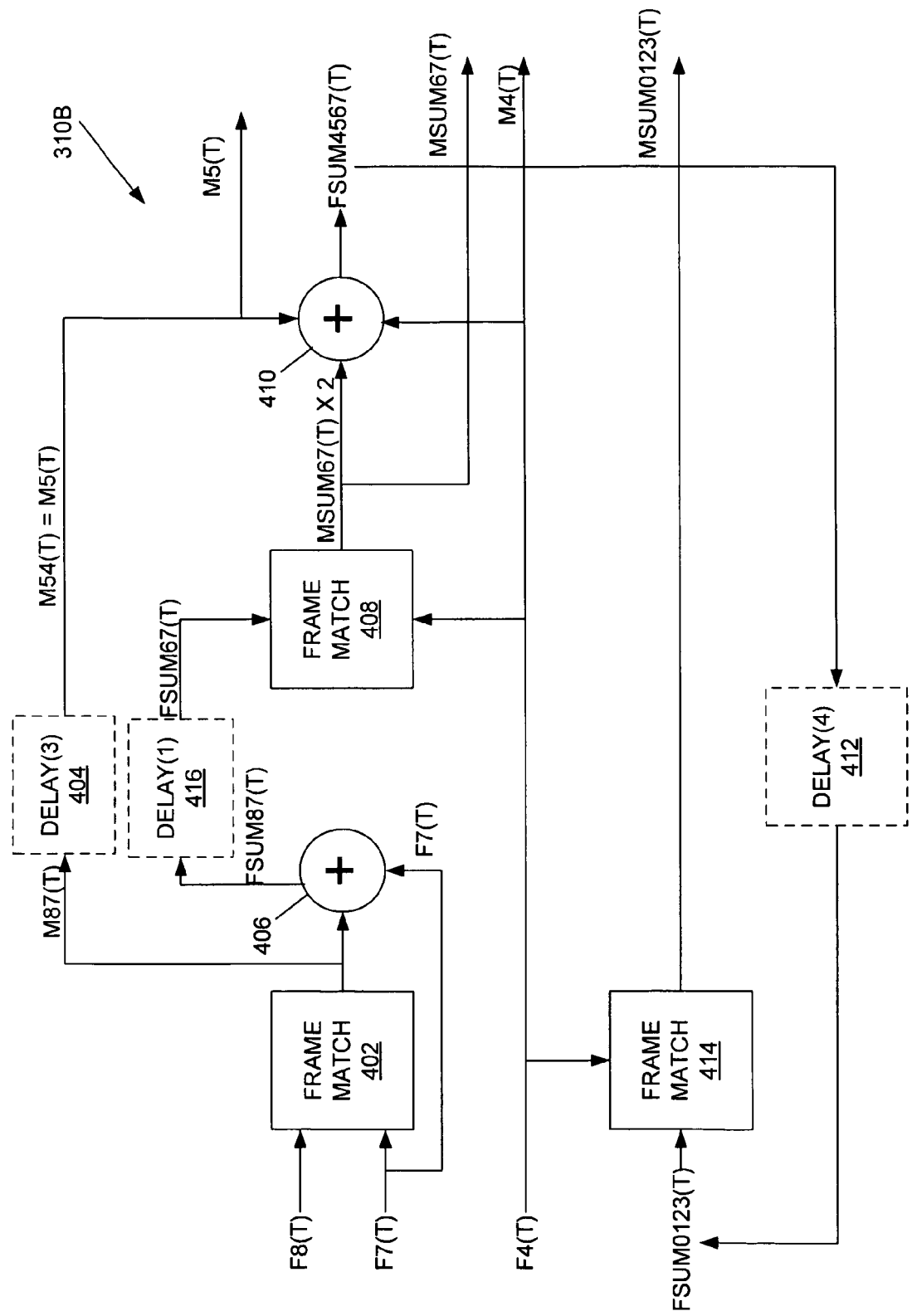
FIG. 4B is a block diagram that illustrates another example embodiment of a frame alignment module.

Before proceeding with the description of the overlapped block processing module 350, example embodiments of the frame alignment module 310 are explained below and illustrated in FIGS. 4A and 4B. One example embodiment of a frame alignment module 310a, shown in FIG. 4A, receives frames F4(t), F6(t), F7(t), and FSUM0123(t). It is noted that M5(t) is the same as M76(t-2), which is the same as M54(t). F7(t) is frame-matched to F6(t) at frame match module 402, producing M76(t). After a delay (404) of two (2) frames, M76(t) becomes M54(t), which is the same as M5(t). Note that blocks labeled "delay" and shown in phantom (dotted lines) in FIGS. 4A-4B are intended to represent delays imposed by a given operation, such as access to memory. F6(t) is summed with M76(t) at summer 406, resulting in FSUM67(t). FSUM67(t) is frame-matched to F4(t) at frame match module 408, producing MSUM67(t). MSUM67(t) is multiplied by two (2) and added to F4(t) and M5(t) at summer 410, producing FSUM4567(t). FSUM4567(t) can be viewed as frames F5(t) through F7(t) all matched to F4(t) and summed together along with F4(t). FSUM4567(t) is delayed (412) by four (4) frames producing FSUM0123(t) (i.e., FSUM4567(t-4)=FSUM0123(t)). FSUM0123(t) is frame-matched to F4(t) at frame match module 414 producing MSUM0123(t). Accordingly, the output of the frame alignment module 310a comprises the following frames: MSUM0123(t), M4(t), M5(t), and MSUM67(t).

One having ordinary skill in the art should understand in the context of the present disclosure that equivalent frame processing to that illustrated in FIG. 4 may be realized by the imposition of different delays in the process, and hence use of different time sequences of frames in a given temporal sequence as the input. For instance, as shown in FIG. 4B, for frame alignment module 310b, an extra frame delay 416 corresponding to the derivation of frames F6(t) and F7(t) from FSUM87(t) may be inserted, resulting in frames FSUM67(t). All other modules function are as explained above in association with FIG. 4A, and hence omitted here for brevity. Such a variation to the embodiment described in association with FIG. 4A enables all frame-matching operations to work out of memory.

Figure 5:
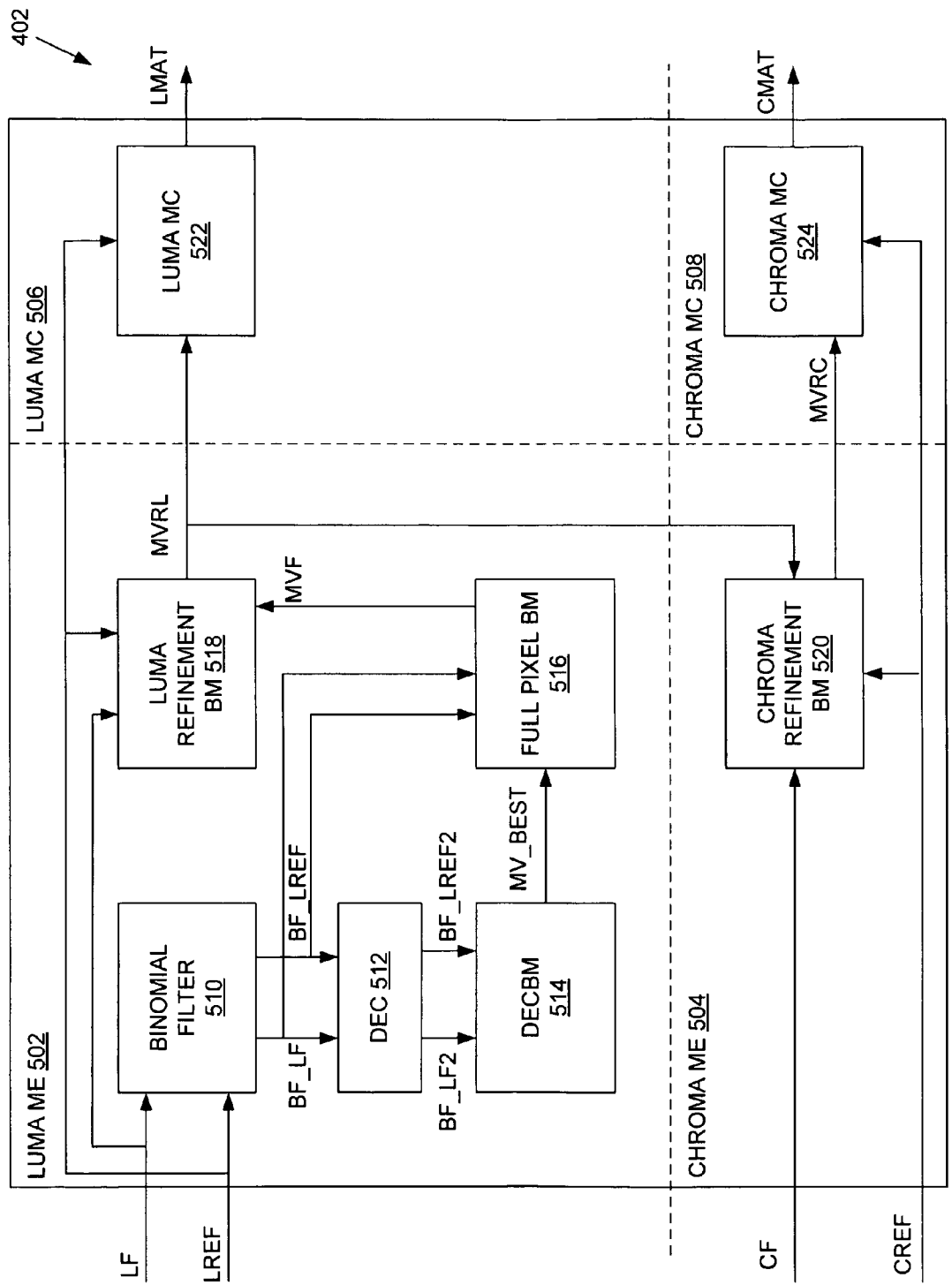
FIG. 5 is a block diagram that illustrates one example embodiment of a frame matching module of a frame alignment module.

One example embodiment of a frame match module, such as frame match module 402, is illustrated in FIG. 5. It should be understood that the discussion and configuration of frame match module 402 similarly applies to frame match modules 408 and 414, though not necessarily limited to identical configurations. Frame match module 402 comprises motion estimation (ME) and motion compensation (MC) functionality (also referred to herein as motion estimation logic and motion compensation logic, respectively), which is further subdivided into luma ME 502 (also luma ME logic or the like), chroma ME 504 (also chroma ME logic or the like), luma MC 506 (also luma MC logic or the like), and chroma MC 508 (also chroma MC logic or the like). In one embodiment, the luma ME 502 comprises a binomial filter 510 (also referred to herein as a pixel filter logic), a decimator 512 (also referred to herein as decimator logic), a decimated block matching (DECBM) module 514 (also referred to herein as decimated block matching logic), a full pixel bock matching (BM) module 516 (also referred to herein as full pixel block matching logic), and a luma refinement BM module 518. The chroma ME 504 comprises a chroma refinement BM module 520. The luma MC 506 comprises a luma MC module 522, and the chroma MC 508 comprises a chroma MC module 524.

The frame matching module 402 takes as input two video frames, each of which includes luminance and chrominance data in either of the well known CCIR-601 4:2:0 or 4:2:2 formats, though not limited to these formats, and in some embodiments may receive a proprietary format among other types of formats. For 4:2:0 formats, the chrominance includes two channels subsampled by a factor of two (2) in both the vertical and horizontal directions. For 4:2:2 formats, the chrominance is subsampled in only the horizontal direction. The luminance inputs are denoted in FIG. 5 as LREF and LF, which represent the reference frame luminance and a frame luminance to match to the reference, respectively. Similarly, the corresponding chrominance inputs are denoted as CREF (reference) and CF (frame to match to the reference). The output of the frame match process is a frame which includes luminance (LMAT) data and chrominance (CMAT) data. For instance, according to the embodiments described in association with, and illustrated in, FIGS. 2C, 3A, and 5, LREF, CREF, LF, CF and LMAT, CMAT correspond to the sets of frames given in Table 1 below:

TABLE 1

Sets of Frames Undergoing Frame Matching

| LREF, CREF | LF, CF | LMAT, CMAT | Description |
| --- | --- | --- | --- |
| F6(t) | F7(t) | M76(t) | Frame Match F7(t) to F6(t) M76(t) is an estimate of F6(t) from F7(t) |
| F4(t) | FSUM67(t) | MSUM67(t) | Frame Match FSUM67(t) to F4(t) Normalize FSUM67(t) with divide by 2 prior to Frame Match. MSUM67(t) is an estimate of F4(t) from both F6(t) and F7(t) |

TABLE 1-continued

Sets of Frames Undergoing Frame Matching

| LREF, CREF | LF, CF | LMAT, CMAT | Description |
| --- | --- | --- | --- |
| F4(t) | FSUM0123(t) | MSUM0123(t) | Frame Match FSUM0123(t) to F4(t) Normalize FSUM(t-4) with divide by 4 prior to Frame Match. MSUM0123(t) is an estimate of F4(t) from F0(t), F1(t), F2(t), F3(t) (or equivalently, F4(t-4), F5(t-4), F6(t-4), F7(t-4)) |

In general, one approach taken by the frame match module 402 is to perform block matching on blocks of pixels (e.g., 8×8) in the luminance channel, and to export the motion vectors from the block matching of the luminance channel for re-use in the chrominance channels. In one embodiment, the reference image LREF is partitioned into a set of 8×8 non-overlapping blocks. The final result of frame-matching is a set of motion vectors into the non-reference frame, LF, for each 8×8 block of LREF to be matched. Each motion vector represents the 8×8 block of pixels in LF which most closely match a given 8×8 block of LREF. The luminance pixels are filtered with a binomial filter and decimated prior to block matching.

The luma ME 502 comprises logic to provide the filtering out of noise, coarse block matching (using a multi-level or multi-stage hierarchical approach that reduces computational complexity) of the filtered blocks, and refined block matching using undecimated pixel blocks and a final motion vector derived from candidates of the coarse block matching process and applied to unfiltered pixels of the inputted frames. Explaining in further detail and with reference to FIG. 5, the luminance input (LREF, LF) is received at binomial filter 510, luma refinement BM module 518, and luma MC module 522. The binomial filter 510 processes the data and produces full-pixel luminance (BF_LF, BF_LREF), each of the luminance images of size $N_{ver} \times N_{hor}$. The binomial filter 510 performs a 2D convolution of each input frame according to the following equation:

$$BF\_X(i, j) = \sum_{m=-1}^{1} \sum_{n=-1}^{1} x(m, n) G(i - m, j - n), \quad \text{Eq. (2)}$$

where $x(0: N_{ver}-1, 0: N_{hor}-1)$ is an input image of size $N_{ver} \times N_{hor}$, BF_X(i,j) is the binomial filtered output image, and G(m,n) is the 2D convolution kernel given by the following equation:

$$G(i, j) = \frac{1}{16} \begin{pmatrix} 1 & 2 & 1 \\ 2 & 4 & 2 \\ 1 & 2 & 1 \end{pmatrix} \quad \text{Eq. (3)}$$

Accordingly, LF and LREF are both binomial filtered according to Eq. (3) to produce BF_LF and BF_LREF, respectively, which are also input to the decimator 512 and the full BM module 516. Although a binomial filter is described as one example pixel filter, in some embodiments, other types of filters may be employed without undue experimentation, as should be understood by one having ordinary skill in the art.

BF_LF and BF_LREF are received at decimator 512, which performs, in one embodiment, a decimation by two (2) function in both the vertical and horizontal dimensions to produce BF_LF2 and BF_LREF2, respectively. The output of the decimator 512 comprises filtered, decimated luminance data (BF_LF2, BF_LREF2), where each of the luminance images are of size $N_{ver}/2 \times N_{hor}/2$. Thus, if the size of LF and LREF are both $N_{ver} \times N_{hor}$ pixels, then the size of BF_LF2 and BF_LREF2 are $N_{ver}/2 \times N_{hor}/2$ pixels. In some embodiments, other factors or functions of decimation may be used, or none at all in some embodiments.

The decimated, binomial-filtered luma pixels, BF_LF2 and BF_LREF2, are input to the DECBM module 514, which performs decimated block matching on the filtered, decimated data (BF_LF2, BF_LREF2). In one embodiment, the DECBM module 514 applies 4×4 block matching to the 4×4 blocks of BF_LREF2 to correspond to the 8×8 blocks of BF_LREF. In other words, the 4×4 pixel blocks in the decimated domain correspond to 8×8 blocks in the undecimated domain. The DECBM module 514 partitions BF_LREF2 into a set of 4×4 blocks given by the following equation:

$$BREF2(i, j) = BF\_LREF2(4i: 4i+3, 4j: 4j+3), \quad \text{Eq. (4)}$$

where $i = 0, 1, \ldots \frac{N_{hor}-1}{4}$ and $j = 0, 1, \ldots \frac{N_{ver}-1}{4}$.

It is assumed that BF_LREF2 is divisible by four (4) in both the vertical and horizontal dimensions. The set of 4×4 blocks BREF2(i,j) in Eq. (4) includes all pixels of BF_LREF2 partitioned as non-overlapping 4×4 blocks. A function of the DECBM module 514 is to match each of these blocks to the most similar blocks in BF_LF2.

For each of the 4×4 blocks at BREF2(i,j), the DECBM module 514 searches, in one example embodiment, over a ±24 horizontal by ±12 vertical search area of BF_LF2 (for a total 49×25 decimated pixel area) to find 4×4 pixel blocks which most closely match the current 4×4 block. In some embodiments, differently configured (e.g., other than 24×12) search areas are contemplated. The search area of BF_LF2 is co-located with the block BREF2 (i,j) to be matched. In other words, the search region BF_LF2_SEARCH(i,j) may be defined by the following equation:

$$BF\_LF2\_SEARCH(i,j) = BF\_LF2(4i:4i\pm12, 4j:4j\pm24) \quad \text{Eq. (5)}$$

Eq. (5) defines the search region as a function of (i j) that is centered at the co-located block BF_LF2(4i,4j) as in BF_LREF2 (4i,4j), or equivalently BREF2(i,j). The search region may be truncated for blocks near the borders of the frame where a negative or positive offset does not exist. Any 4×4 block at any pixel position in BF_LF2_SEARCH(i,j) is a candidate match. Therefore, the entire search area is traversed extracting 4×4 blocks, testing the match, then moving one (1) pixel horizontally or one (1) pixel vertically. This operation is well-known to those with ordinary skill in the art as "full search" block matching, or "full search" motion estimation.

One matching criterion, among others in some embodiments, is defined as a 4×4 Sum-Absolute Difference (SAD) between the candidate block in BF_LF2 search area and the current BREF2 block to be matched according to Eq. 6 below:

$$SAD4x4(y, x) = \sum_{u=0}^{3} \sum_{v=0}^{3} |BF\_LF2(4i + y + u, 4j + x + v) - BREF2(i + u, j + v)|$$

(Eq. (6)), where $-24 \leq x \leq 24$, $-12 \leq y \leq 12$. The values of y and x which minimize the SAD 4×4 function in Eq. (6) define the best matching block in BF_LF2. The offset in pixels from the current BREF2 block in the vertical (y) and horizontal (x) directions defines a motion vector to the best matching block. If a motion vector is denoted by mv, then mv.y denotes the motion vector vertical direction, and mv.x denotes the horizontal direction. Note that throughout the present disclosure, reference is made to SAD and SAD computations for distance or difference measures. It should be understood by one having ordinary skill in the art that other such difference measures, such as sum-squared error (SSE), among others well-known to those having ordinary skill in the art can be used in some embodiments, and hence the example embodiments described herein and/or otherwise contemplated to be within the scope of the disclosure are not limited to SAD-based difference measures.

In one embodiment, the DECBM module 514 may store not only the best motion vector, but a set of candidate motion vectors up to N_BEST_DECBM_MATCHES, where N_BEST_DECBM_MATCHES is a parameter having an integer value greater than or equal to one. For example, in one implementation, N_BEST_DECBM_MATCHES=3. As the DECBM module 514 traverses the search area, computing SAD 4×4 according to Eq. (6), the DECBM module 514 keeps track of the N_BEST_DECBM_MATCHES (e.g., minimum SAD 4×4 blocks) by storing the motion vectors (x and y values) associated with those blocks and the SAD 4×4 value. In one embodiment, a block is only included in the N_BEST_DECBM_MATCHES if its distance in either of the horizontal or vertical directions is greater than one (1) from any other saved motion vectors. The output of the DECBM module 514 is a set of motion vectors (MV_BEST) corresponding to N_BEST_DECBM_MATCHES, the motion vectors input to the full pixel BM module 516. In some embodiments, in addition to MV_BEST, the DECBM module 514 adds one or more of the following two motion vector candidates, if they are not already in the MV_BEST set: a zero motion vector and/or a motion vector of a neighboring block (e.g., a block located one row above). For example, if N_BEST_DECBM_MATCHES=3, meaning three (3) candidate motion vectors come from the DECBM module 514, then the total candidate motion vectors is five (5) (three (3) from the DECBM module SAD 4×4 operation plus a zero motion vector plus a neighboring motion vector). Therefore, in this example, if N_BEST_DECBM_MATCHES=3, then the total candidate motion vectors is five (5).

The DECBM module 514 omits from a search the zero vector (mv.x=0, mv.y=0) as a candidate motion vector output and any motion vectors within one pixel of the zero vector since, in one embodiment, the zero vector is always input to the next stage processing in addition to the candidate motion vectors from the DECBM module 514. Therefore, if N_BEST_DECBM_MATCHES=3, then the three (3) motion vectors consist of non-zero motion vectors, since any zero motion vectors are omitted from the search. Any zero-motion vector is included as one of the added motion vectors of the output of the DECBM module 514. In some embodiments, zero vectors are not input to the next stage and/or are not omitted from the search.

The full pixel BM module 516 receives the set of candidate motion vectors, MV_BEST, and performs a limited, full pixel block matching using the filtered, undecimated frames (BF_LF, BF_LREF). In other words, the full pixel BM module 516 takes as input the motion vectors obtained in the DECBM module-implemented process, in addition to the zero motion vector and the motion vector from a neighboring block as explained above, and chooses a single refined motion vector from the candidate set. In some embodiments, a neighboring motion vector is not included as a candidate.

Operation of an embodiment of the full pixel BM module 516 is described as follows. The full pixel BM module 516 partitions BF_LREF into 8×8 blocks corresponding to the 4×4 blocks in BF_REF2 as follows:

$$BREF(i,j)=BF\_LREF(8i{:}8i+7,8j{:}8j+7), \qquad \text{Eq. (7)}$$

where $$i = 0, 1, \ldots \frac{N_{hor} - 1}{8}, \text{ and } j = 0, 1, \ldots \frac{N_{ver} - 1}{8}.$$

BREF is a set of non-overlapping 8×8 blocks comprising the entire luminance frame BF_LREF with a direct correspondence to the BREF2 4×4 blocks. The full pixel BM module 516 receives the MV_BEST motion vectors from the DECBM module 514 and the full pixel (undecimated), binomial filtered luminance BF_LREF and BF_LF.

The input, MV_BEST, to the full pixel BM module 516, may be denoted according to the following set: MV_BEST={mv_best(0), mv_best(1), . . . mv_best(N_BEST_DECBM_MATCHES−1)}. The full pixel BM module 516 scales the input motion vectors to full pixel by multiplying the x and y coordinates by two (2), according to Eq. (8) as follows:

$$mvfull(k).x=2 \times mv\_best(k).$$
$$x 0 \leq k < N\_BEST\_DECBM\_MATCHES,$$

$$mvfull(k).y=2 \times mv\_best(k).$$
$$y 0 \leq k < N\_BEST\_DECBM\_MATCHES \qquad \text{(Eq. (8))}$$

where $0 \leq k \leq N\_BEST\_DECBM\_MATCHES-1$. Note that the zero motion vector and neighboring block motion vector do not need scaling since zero does not need scaling, and the neighboring block motion vector is already scaled (sourced from the full pixel BM module 516). After scaling to full pixel, the full pixel BM module 516 determines a refined motion vector, mvrfull(k), from its corresponding candidate motion vector, mvfull(k), by computing a minimum SAD for 8×8 full-pixel blocks in a 5×5 refinement search around the scaled motion vector according to Eq. (9):

$$SAD8x8(i, j, mvfull(k) \cdot y + m, mvfull(k) \cdot x + n) = \qquad \text{Eq. (9)}$$

$$\sum_{u=0}^{7}\sum_{v=0}^{7}|BF\_LR(8i + mvfull(k) \cdot y + n + u,$$

$$8j + mvfull(k) \cdot x + m + v) - BREF(i + u, j + v)|$$

where $-2 \le m \le 2$, $-2 \le n \le 2$. Note that one having ordinary skill in the art should understand in the context of the present disclosure that refinement search ranges other than 5×5 are possible and hence contemplated for some embodiments. Minimizing Eq. (9) for each motion vector of the candidate set results in (N_BEST_DECBM_MATCHES+2) refined candidate motion vectors, mvrfull(k), where $0 \le k <$ (N_BEST_ DECBM_MATCHES+2). The full pixel BM module 516 selects a final winning motion vector from the refined motion vectors by comparing the SAD of the refined motion vectors according to the following equation:

$$[kf] = \operatorname*{Min}_k\{\lambda * MVDIST(k) + DISTBIAS(k) + \qquad \text{Eq. (10)}$$

$$SAD8x8(i, j, mvrfull(k) \cdot y, mvrfull(k) \cdot x)\}$$

where:
kf=index of refined motion vector that is the winner;
MVDIST(k)=min(dist(mvrfull(k), 0), dist(mvrfull(k), mvfull(B)));
mvfull(B)=winning motion vector of neighboring block;
dist(a,b)=distance between motion vectors a and b;
min(x,y)=minimum of x and y;
DISTBIAS(k)=0 for MVDIST(k)<12, 20 for MVDIST(k) <20, 40 otherwise $\lambda$=operational parameter, e.g. $\lambda$=4
In other words, the larger the motion vector, the lower the SAD value to justify the larger motion vector as a winning candidate. For instance, winners comprising only marginally lower SAD values likely results in random motion vectors. The 12, 20, 40 values described above forces an increased justification (lower SAD values) for increasingly larger motion vectors. In some embodiments, other values and/or other relative differences between these values may be used (e.g., 1, 2, 3 or 0, 10, 20, etc.]. Therefore, the final motion vector result from the full pixel block mode operation of full pixel BM module 516 is given by:

$$mvf(i,j).x=mvrfull(kf).x$$

$$mvf(i,j).y=mvrfull(kf).y \qquad \text{Eq. (11)}$$

If the SAD value in Eq. (9) corresponding to the best motion vector of Eq. (11) is above a threshold, T_SAD, the block is flagged as a bad block (e.g., BAD_MC_BLOCK) so that instead of copying the block indicated by the motion vector in the search frame, the motion compensation process (described below) copies the original block of the reference frame instead.

The resultant output of the full pixel BM module 516 comprises a single final motion vector, MVF, for each non-overlapping block, which is input to the luma refinement BM module 518. The luma refinement BM module 518 (like the full pixel BM module 516) uses 8×8 block matching since it receives as input full (non-decimated) images. That is, the luma refinement BM module 518 refines the motion vectors using original unfiltered frame data (LREF, LF), or more specifically, takes as input the set of motion vectors MVF obtained in the full pixel BM module 516 and refines the motion vectors using original unfiltered pixels. Explaining further, the luma refinement BM module 518 partitions the original noisy LREF into 8×8 non-overlapping blocks corresponding to the 8×8 blocks in BF_REF according to the following equation:

$$REF(i,j)=LREF(8i:8i+7,8j:8j+7), \qquad \text{Eq. (12)}$$

where $$i = 0, 1, \ldots \frac{N_{hor}-1}{8}, \text{ and } j = 0, 1, \ldots \frac{N_{ver}-1}{8}.$$

REF is a set of non-overlapping 8×8 blocks comprising the entire luminance frame LREF with a direct correspondence to the BREF 8×8 blocks. For each block to be matched in REF, there is a motion vector from full pixel block mode operation of full pixel BM module 516 (e.g., mvf(i,j)). In one embodiment, a 1-pixel refinement around mvf(i,j) proceeds by the m and n which minimizes the following equation:

$$SAD8x8(i, j, mvf(i, j) \cdot y + m, mvf(i, j) \cdot x + n) = \qquad \text{Eq. (13)}$$

$$\sum_{u=0}^{7}\sum_{v=0}^{7}|LF(8i + mvf(i, j) \cdot y + u + n,$$

$$8j + mvf(i, j) \cdot x + v + m) - REF(i + u, j + v)|$$

where $-1 \le m \le -1$, $-1 \le n \le -1$. In some embodiments, pixel refinement other than by one (1-pixel) may be used in some embodiments, or omitted in some embodiments. The refined motion vector for the block at position i,j is given by the values of m and n, mref and nref respectively, which minimize Eq. (13). The refined motion vector is given by Eq. (14) as follows:

$$mvr(i, j) \cdot x = \qquad \text{Eq. (14)}$$

$$mvf(i, j) \cdot x + mrefmvr(i, j) \cdot x = mvf(i, j) \cdot x + mref$$

$$mvr(i, j) \cdot y =$$

$$mvf(i, j) \cdot x + nrefmvr(i, j) \cdot y = mvf(i, j) \cdot x + nref$$

where $i = 0, 1, \ldots \frac{N_{hor}-1}{8}$, and $j = 0, 1, \ldots \frac{N_{ver}-1}{8}$.

MVRL (also referred to herein as refined motion vector(s)) denotes the complete set of refined motion vectors mvr(i,j) (e.g., for i=0, 8, 16, ... $N_{ver}$-7; j=0, 8, 16, ... $N_{Hor}$-7) for the luminance channel output from the luma refinement BM module 518. In other words, MVRL denotes the set of motion vectors representing every non-overlapping 8×8 block of the entire frame.

MVRL is used by the luma MC module 522 and the chroma refinement BM module 520. Referring to the chroma refinement BM module 520, the refined motion vectors, MVRL, are received at the chroma refinement BM module 520, which performs a refined block matching in the chrominance channel based on inputs CF and CREF. For 4:2:0 video formats, when the chroma is sub-sampled by a factor of two (2) in each of the horizontal and vertical dimensions, the chroma refinement BM module 520 performs 4×4 full-pixel block matching. That is, the chroma (both Cb and Cr) 4×4 blocks correspond directly to the luma 8×8 blocks. Using the MVRL input, the chroma refinement BM module 520, for both Cb and Cr chroma frames, performs a 1-pixel refinement around the MVRL input motion vectors in a similar manner to the process performed by the luma refinement BM module 518 described above, but using 4×4 blocks instead of 8×8, and a SAD 4×4 instead of SAD 8×8 matching criterion. The resulting set of motion vectors are MVRCb for Cb and MVRCr for Cr (collectively shown as MVRC in FIG. 5), which are input to the chroma MC module 524 to perform motion compensation.

Motion compensation is a well-known method in video processing to produce an estimate of one frame from another (i.e., to "match" one frame to another). MVRL and MVRC are input to motion compensation (MC) processes performed at luma MC module 522 and chroma MC module 524, respectively, which import the blocks indicated by the MVRL and MVRC motion vectors. With reference to the luma MC module 522, after the block matching has been accomplished as described hereinabove, the LF frame is frame-matched to LREF by copying the blocks in LF indicated by the motion vectors MVRL. For each block, if the block has been flagged as a BAD_MC_BLOCK by the full pixel BM module 516, instead of copying a block from the LF frame, the reference block in LREF is copied instead. For chroma operations, the same process is carried out in chroma MC module 508 on 4×4 blocks using MVRCb for Cb and MVRCr for Cr, and hence discussion of the same is omitted for brevity. Note that 8×8 and 4×4 were described above for the various block sizes, yet one having ordinary skill in the art should understand that in some embodiments, other block sizes than those specified above may be used.

With reference to FIG. 3, having described an example embodiment of the various modules or logic that comprise the frame alignment module 310 for the VDN system embodiment 200c-1, attention is directed to the overlapped block processing module 350. In general, after frame matching, the overlapped block processing module 350 denoises the overlapped 3D blocks and accumulates the results, as explained in association with FIGS. 2A-2C. In one embodiment, looping occurs by stepping j by a step size s in pixels (e.g. s=2). The overlapped block processing moves horizontally until j==N$_{Hor}$−1, after which j is set to 0 and i is incremented by s. Note that in some embodiments, seven (7) pixels are added around the border of the frame to enable the border pixels to include all blocks. For simplicity, these pixels may be a DC value equal to the touching border pixel.

Referring again to FIG. 3, the overlapped block processing module 350 receives the matched frames M4($t$), M5($t$), MSUM67($t$), and MSUM0123($t$), and extracts co-located blocks of 8×8 pixels from these four (4) frames. Denote the four (4) blocks extracted at a particular i,j pixel position in the four (4) frames as b(i,j,t) with t=0 . . . 3, then after reordering of the blocks (as explained below in the context of the 1D transform illustrated in FIGS. 6A-6D), the following terminology is described:

b(i,j,0) is an 8×8 block from MSUM0123($t$) at pixel position i,j
b(i,j,1) is an 8×8 block from M4($t$) at pixel position i,j
b(i,j,2) is an 8×8 block from M5($t$) at pixel position i,j
b(i,j,3) is an 8×8 block from MSUM67($t$) at pixel position i,j Starting with i=0 and j=0, the upper left corner of the frames, a 2D transform module 304 (also referred to herein as transform logic) extracts the four (4) blocks b(0,0,0:3) and performs a 2D transform. That is, the 2D transform is taken on each of the four (4) temporal blocks b(i,j,t) with 0≤t≤3, where i,j is the pixel position of the top left corner of the 8×8 blocks in the overlapped block processing. In some embodiments, a 2D-DCT, DWT, among other well-known transforms may be used as the spatial transform. In an embodiment described below, the 2D transform is based on an integer DCT defined in the Advanced Video Coding (AVC) standard (e.g., an 8×8 AVC-DCT), which has the following form:

$$H(X) = DCT(X) = C \cdot X \cdot C^T \qquad \text{Eq. (15)}$$

where, $$C = \begin{bmatrix} 8 & 8 & 8 & 8 & 8 & 8 & 8 & 8 \\ 12 & 10 & 6 & 3 & -3 & -6 & -10 & -12 \\ 8 & 4 & -4 & -8 & -8 & -4 & 4 & 8 \\ 10 & -3 & -12 & -6 & 6 & 12 & 3 & -10 \\ 8 & -8 & -8 & 8 & 8 & -8 & -8 & 8 \\ 6 & -12 & 3 & 10 & -10 & -3 & 12 & -6 \\ 4 & -8 & 8 & -4 & -4 & 8 & -8 & 4 \\ 3 & -6 & 10 & -12 & 12 & -10 & 6 & -3 \end{bmatrix} \cdot \frac{1}{8}$$

X is an 8×8 pixel block, and the products on the right are matrix multiplies. One method for computing the DCT employs the use of signed powers of two for computing the multiplication products. In this way no hardware multipliers are needed; but rather, the products are created by shifts and additions thereby reducing the overall logic. In some embodiments, hardware multipliers may be used. In addition, scaling factors may be used, which may also reduce the required logic. To retrieve the original pixels (X), the integer matrix is scaled such that the inverse DCT implemented by the inverse 2D transform module 314 yields the original values of X. One form of the inverse AVC-DCT of the inverse transform module 314 comprises the following:

$$X = (C^T \cdot H(X) \cdot C) \otimes S_{i,j}, \qquad \text{Eq. (16)}$$

or by substitution:

$$X = C_s^T \cdot H(X) \cdot C_s, \qquad \text{Eq. (17)}$$

where $C_s = C \otimes S_{i,j}$ and the symbol $\otimes$ denotes element by element multiplication. One example of scaling factors that may be used is given below:

$$S_{i,j} = \frac{1}{\sum_{i,j=0}^{7} C_{(i,j)}^2} = \begin{matrix} 0.0020 \\ 0.0017 \\ 0.0031 \\ 0.0017 \\ 0.0020 \\ 0.0017 \\ 0.0031 \\ 0.0017 \end{matrix} \qquad \text{Eq. (18)}$$

After the 2D transform, the overlapped block processing module 350 changes the spatial dimension from 2D to 1D by zig-zag scanning the output of each 2D transform from low frequency to highest frequency, so the 2D transformed block bs(i,j,f) becomes instead bs(zz_index, f), where 0≤zz_index≤63, 0≤f≤3. The mapping of (i,j) to zz_index is given by the zig_zag_scan vector below, identical to the scan used in MPEG-2 video encoding. In some embodiments, the 2D dimension may be retained for further processing. If the first row of the 2D matrix is given by elements 0 through 7, the second row by 8 through 16, then zig_zag_scan[0:63] specifies a 2D to 1D mapping as follows:

```
zig_zag_scan[0:63] =
{
  0,1,8,16,9,2,3,10,17,24,32,25,18,11,4,5,
  12,19,26,33,40,48,41,34,27,20,13,6,7,14,21,28,
  35,42,49,56,57,50,43,36,29,22,15,23,30,37,44,51,
  58,59,52,45,38,31,39,46,53,60,61,54,47,55,62,63
};
```

At a time corresponding to computation of the 2D transform (e.g., subsequent to the computation), the temporal mode (TemporalMode) is selected by temporal mode module 302 (also referred to herein as temporal mode logic). When utilizing a Haar 1-D transform, the TemporalMode defines whether 2D or 3D thresholding is enabled, which Haar subbands are thresholded for 3D thresholding, and which spatial subbands are thresholded for 2D thresholding. The temporal mode may either be SPATIAL_ONLY, FWD4, BAK4, or MODE8, as further described hereinbelow. The temporal mode is signaled to the 2D threshold module 306 and/or the 3D threshold module 310 (herein also collectively or individually referred to as threshold logic or thresholding logic). If the TemporalMode=SPATIAL_ONLY, then the 2D transformed block bs(zz_index, 1) is thresholded yielding bst (zz_index, 1). If the temporal mode is not SPATIAL_ONLY, then bst(zz_index,t) is set to bs(zz_index, f).

Following spatial thresholding by the 2D threshold module 306, the bst(zz_index, t) blocks are 1D transformed at the 1D transform module 308 (also referred to herein as transform logic), yielding bhaar(zz_index, f). The 1D transform module 308 takes in samples from the 2D transformed 8×8 blocks that have been remapped by zig-zag scanning the 2D blocks to 1D, so that bs(zz_index,f) represents a sample at $0 \leq zz\_index \leq 63$ and $0 \leq f \leq 3$ so that the complete set of samples is bs(0:63, 0:3). Whereas the 2D transform module 304 operates on spatial blocks of pixels from the matched frames, the 1D transform module 308 operates on the temporal samples across the 2D transformed frame blocks at a given spatial index $0 \leq zz\_index \leq 63$. Therefore, there are sixty-four (64) 1D transforms for each set of four (4) 8×8 blocks.

As indicated above, the 1D Transform used for the VDN system embodiment 200c-1 is a modified three-level, 1D Haar transform, though not limited to a Haar-based transform or three levels. That is, in some embodiments, other 1D transforms using other levels, wavelet-based or otherwise, may be used, including DCT, WHT, DWT, etc., with one of the goals comprising configuring the samples into filterable frequency bands. Before proceeding with processing of the overlapped block processing module 350, and in particular, 1D transformation, attention is re-directed to FIGS. 6A-6D, which illustrates various steps in the modification of a 1D Haar transform in the context of the reduction in frame matching described in association with FIGS. 2A-2C. It should be understood that each filter in the evolution of the 1D Haar shown in respective FIGS. 6A-6D may be a stand-alone filter that can be used in some VDN system embodiments. A modified Haar wavelet transform is implemented by the 1D transform module 308 (and the inverse in inverse 1D transform module 312) for the temporal dimension that enables frame collapsing in the manner described above for the different embodiments. In general, a Haar wavelet transform in one dimension transforms a 2-element vector according to the following equation:

$$\begin{pmatrix} y(1) \\ y(2) \end{pmatrix} = T \cdot \begin{pmatrix} x(1) \\ x(2) \end{pmatrix}, \quad \text{Eq. (19)}$$

$$\text{where } T = \frac{1}{\sqrt{2}} \begin{pmatrix} 1 & 1 \\ 1 & -1 \end{pmatrix}.$$

From Eq (19), it is observed that the Haar transform is a sum-difference transform. That is, two elements are transformed by taking their sum and difference, where the term $1/\sqrt{2}$ is energy preserving, or normalization. It is standard in wavelet decomposition to perform a so-called "critically sampled full dyadic decomposition."

Figure 6A:
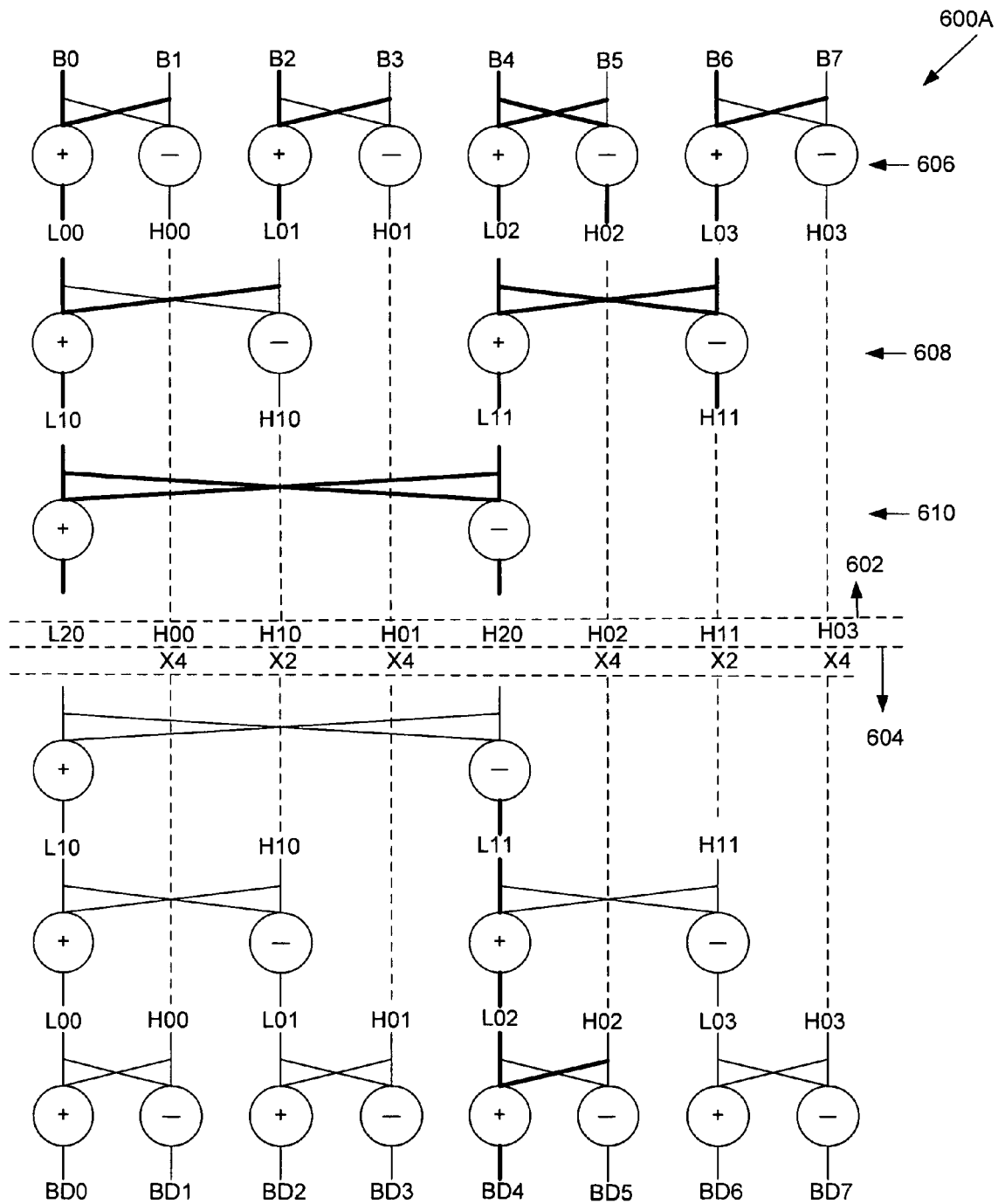
FIGS. 6A-6D are block diagrams that illustrate a modified one-dimensional (1D) transform used in an overlapped block processing module, the 1D transform illustrated with progressively reduced complexity.

A signal flow diagram 600a for the Haar transform, including the forward and inverse transforms, is shown in FIG. 6A. The signal flow diagrams 600a, 600b, 600c, or 600d in FIGS. 6A-6D are illustrative of example processing (from top-down) of 2D transform samples that may be implemented collectively by the 1D transform module 308 and the inverse 1D transform module 312. The signal flow diagram 600a is divided into a forward transform 602 and an inverse transform 604. The normalizing term $1/\sqrt{2}$ may be removed if the transform is rescaled on inverse (e.g., as shown in FIGS. 6A-6D by factors of four (4) and two (2) with x2 and x4, respectively, in the inverse transform section 604). In addition, while FIG. 6A shows the inverse Haar transform 604 following directly after the forward transform 602, it should be appreciated in the context of the present disclosure that in view of the denoising methods described herein, thresholding operations (not shown) may intervene in some embodiments between the forward transform 602 and the inverse transform 604.

In a dyadic wavelet decomposition, a set of samples are "run" through the transformation (e.g. as given by Eq. (19)), and the result is subsampled by a factor of two (2), known in wavelet theory as being "critically sampled." Using 8-samples (e.g., 2D transformed, co-located samples) as an example in FIG. 6A, the samples b0 through b7 are transformed in a first stage 606 by Eq. (19) pair-wise on [b0 b1], [b2 b3], . . . [b6 . . . b7], producing the four (4), low frequency, sum-subband samples [L00, L01, L02, L03] and four (4), high frequency, difference-subband samples [H00, H01, H02, H03]. Since half the subbands are low-frequency, and half are high-frequency, the result is what is referred to as a dyadic decomposition.

An 8-sample full decomposition continues by taking the four (4), low-frequency subband samples [L00, L01, L02, L03] and running them through a second stage 608 of the Eq. (19) transformation with critical sampling, producing two (2) lower-frequency subbands [L10, L11] and two (2) higher frequency subbands [H10, H11]. A third stage 610 on the two (2) lowest frequency samples completes the full dyadic decomposition, and produces [L20, H20].

The 1D Haar transform in FIG. 6A enables a forward transformation 602 and inverse transformation 604 when all samples (e.g., bd(i,j, 0:7)) are retained on output. This is the case for a 3D accumulation buffer. However, as discussed hereinabove, the output of the 2D+1 accumulation buffer (see FIGS. 2A-2B) requires only bd(i,j,4) and bd(i,j,7). Therefore, simplification of the flow diagram of 600a, where only the bd(i,j,4) and bd(i,j,7) are retained, results in the flow diagram denoted as 600b and illustrated in FIG. 6B.

Figure 6B:
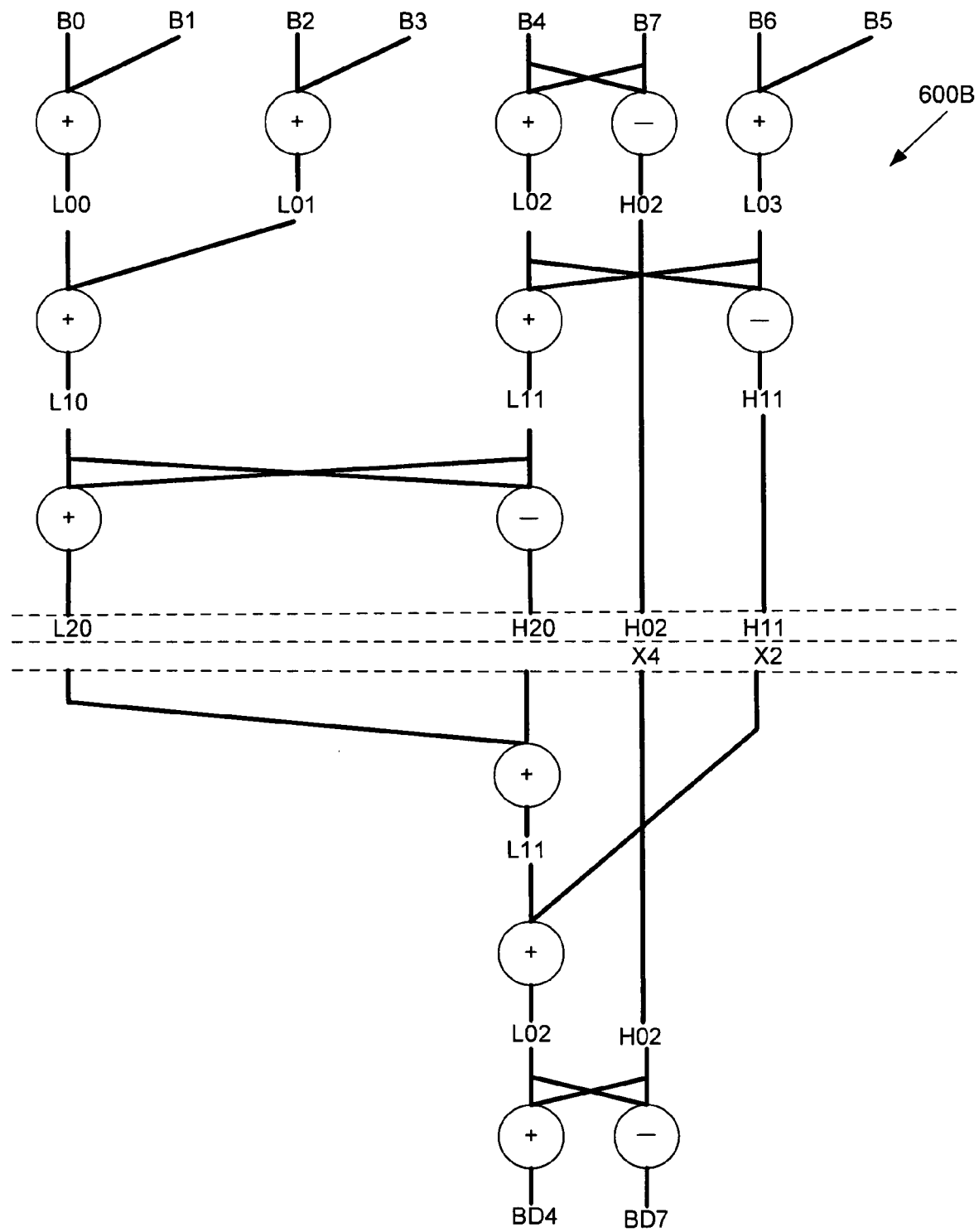

In FIG. 6B, since bd(i,j,4) and bd(i,j,7) are the desired outcome, the entire left-hand side of the transformation process requires only the summation of the first four (4) samples b(i,j, 0:3). As described below, this summation may occur outside the 1D transform (e.g., as part of the frame matching process). On the right side, there has been a re-ordering of the samples when compared to the flow diagram of FIG. 6A (i.e., [b4 b5 b6 b7] to [b4 b7 b6 b5]). In addition, only the sum of b(i,j,5) and b(i,j,6) is required (not a subtraction). Accordingly, by using this simplified transform in flow diagram 600b, with sample reordering, and frame-matching the sum of the first four (4) frames to the reference frame F4($t$), the first four (4) frames may be collapsed into a single frame. For frames 5 and 6, an assumption is made that both frames have been frame matched to the reference producing M5($t$) and M6($t$), and hence those frames may be summed prior to (e.g., outside) the 1D transform.

Figure 6C:
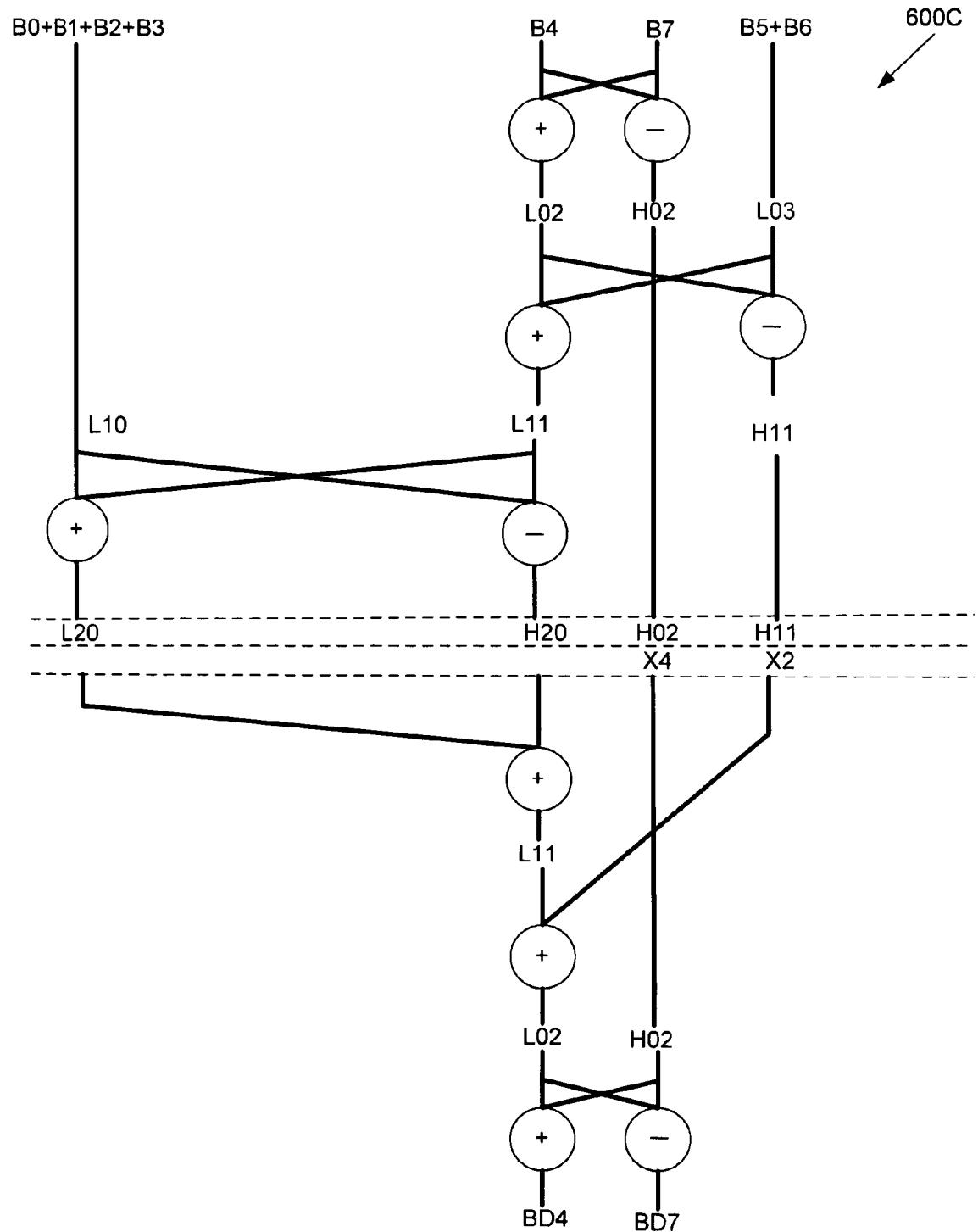

When the summing happens outside the 1D transform, the resulting 1D transform is further simplified as shown in the flow diagram 600c of FIG. 6C, where b0+b1+b2+b3 represents the blocks from the frame-matched sum of frames F0($t$) through F3($t$), that is MSUM0123($t$), prior to the 1D transform, and b5+b6 represents the sum of blocks b(i,j,5) and b(i,j,6) from frame-matched and summed frames M5($t$) and M6($t$), that is MSUM56($t$), the summation implemented prior to the 1D transform. Note that for 2D+1 accumulation embodiments corresponding to Haar modifications corresponding to FIGS. 6B and 6C, there is a re-ordering of samples such that b7 is swapped in and b5 and b6 are moved over.

Figure 6D:
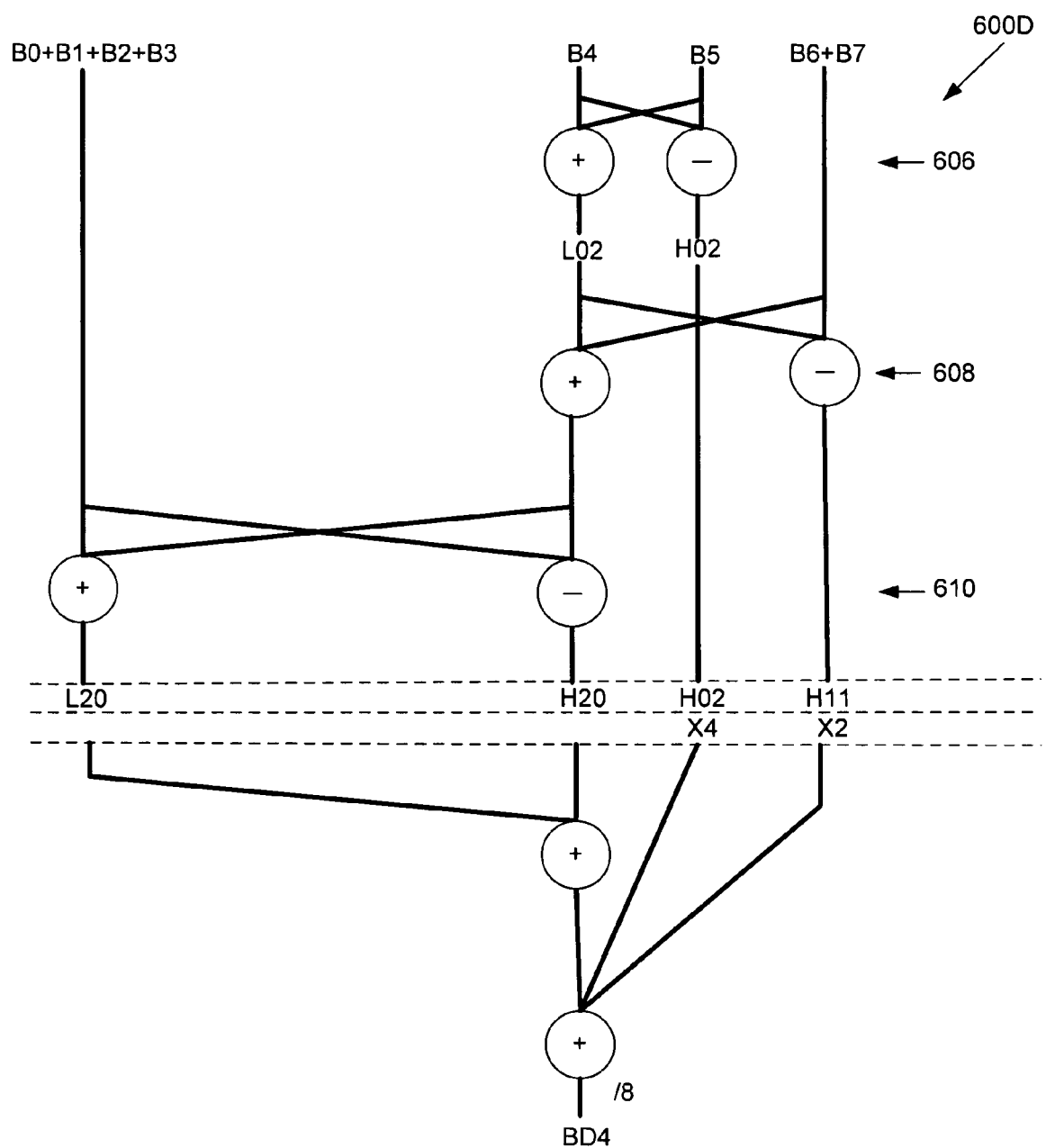

Referring to FIG. 6D, shown is a flow diagram 600d that is further simplified based on a 2D accumulation buffer, as shown in FIG. 2C. That is, only one input sample, bd4, has been retained on output to the 2D accumulation buffer. Note that in contrast to the 2D+1 accumulation buffer embodiments where sample re-ordering is implemented as explained above, the Haar modifications corresponding to FIG. 6D involve no sample re-ordering.

Continuing now with the description pertaining to 1D transformation in the overlapped block processing module 350, and in reference to FIG. 3, at each zz_index, the 1D transform 308 processes the four (4) samples bs(zz_index, 0:3) to produce bhaar(0:63,0:3), which includes Haar subbands [L20, H20, H02, H11]. The first index is from the stages 0, 1, 2, so L20 and H20 are from the $3^{rd}$ stage 610 (FIG. 6D), H02 is from the first stage 606 (FIG. 6D), and H11 is from the $2^{nd}$ stage (608). These Haar subbands are as illustrated in FIG. 6D and are further interpreted with respect to the matched frames as follows:

L20: summation of all matched blocks b(i,j, 0:7);
H20: difference between matched blocks in MSUM0123($t$) and the total sum of matched blocks in M4($t$), M5($t$) and 2×MSUM67($t$);
H02: For 2D+1 Accumulation Buffer (FIG. 6C), difference between matched blocks b4 and b7 from frames M4($t$), and M7($t$), respectively. For 2D Accumulation Buffer (FIG. 6D), difference between matched blocks b4 and b5 from frames M4($t$), and M5($t$), respectively.
H11: For 2D+1 Accumulation Buffer (FIG. 6C), difference between sum (b4+b7) matched blocks from M4($t$) and M7($t$) respectively, and 2×MSUM56($t$). For 2D Accumulation Buffer (FIG. 6D), difference between sum (b4+b5) matched blocks from M4($t$) and M5($t$) respectively, and 2×MSUM56($t$).

Figure 7:
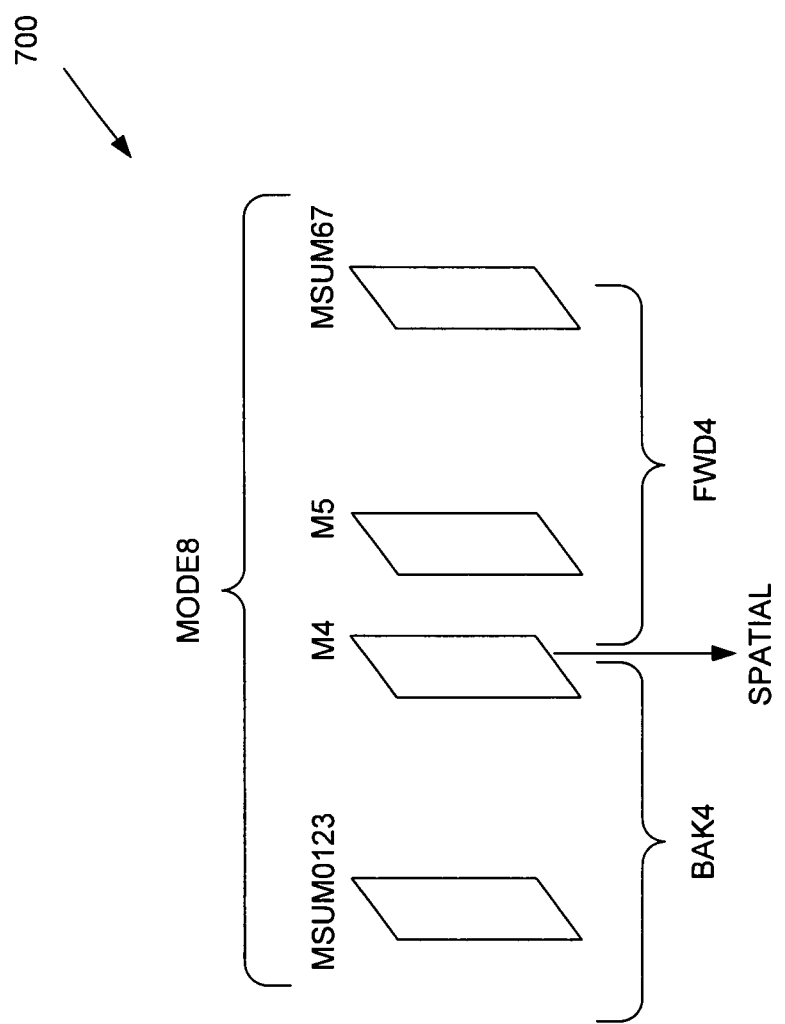
FIG. 7 is a schematic diagram that conceptually illustrates the use of temporal modes in an overlapped block processing module.

With reference to FIG. 7, shown is a schematic diagram 700 that conceptually illustrates the various temporal mode selections that determine whether 3D or 2D thresholding is enabled, and whether Haar or spatial subbands are thresholded for 3D and 2D, respectively. As shown, the selections include MODE8, BAK4, FWD4, and SPATIAL, explained further below. The temporal mode selections make it possible for the VDN systems 200 to adapt to video scenes that are not temporally correlated, such as scene changes, or other discontinuities (e.g., a viewer blinks his or her eye or turns around during a scene that results in the perception of a discontinuity, or discontinuities associated with a pan shot, etc.) by enabling a determination of which frames of a given temporal sequence (e.g., F0($t$)-F7($t$)) can be removed from further transform and/or threshold processing. The TemporalMode selections are as follows:

For TemporalMode==MODE8 or TemporalMode==SPATIAL: (no change). In other words, for TemporalMode set to MODE8 or SPATIAL, there is no need to preprocess the samples before the 1D transform. For FWD4 or BAK4 temporal modes, the samples undergo preprocessing as specified below.

For TemporalMode==FWD4: (Input sample b0+b1+b2+b3 from MSUM0123($t$) is set equal to zero);
For TemporalMode==BAK4: (Input sample b4 set equal to 4*b4);

In one embodiment, a temporal mode module 302 computes TemporalMode after the 2D transform is taken on the 8×8×4 set of blocks. The TemporalMode takes on one of the following four values:

(a) SPATIAL: when the TemporalMode is set to SPATIAL, 2D (spatial) thresholding takes place after the 2D transform on each 2D block bs(0:63, t) 0≤t≤3 separately to produce bst(0:3, t). In other words, under a spatial temporal mode, there is no 1D transformation or thresholding of 3D blocks (temporal dimension is removed for this iteration). If the Temporal Mode is not set to SPATIAL, then bst(0:63, t) is set to bs(0:63, t) (pass-through).

(b) FWD4: when the TemporalMode is set to FWD4, right-sided (later) samples from M4($t$), M5($t$) and MSUM67($t$) are effectively used, and samples from the left (earlier) side, in MSUM0123($t$), are not used.

(c) BAK4: when the TemporalMode is set to BAK4, left-sided (earlier) samples from MSUM0123($t$) and M4($t$) are effectively used, and samples from the right (later) side, in M5($t$) and MSUM67($t$), are not used.

(d) MODE8: when the TemporalMode is set to MODE8, all samples are used.

The TemporalMode is computed for every overlapped set of blocks (e.g., its value is computed at every overlapped block position). Therefore, implicitly, TemporalMode is a function of i,j, so TemporalMode(i,j) denotes the value of TemporalMode for the i,j-th pixel position in the overlapped block processing. The shorthand, "TemporalMode" is used throughout herein with the understanding that TemporalMode comprises a value that is computed at every overlapped block position of a given frame to ensure, among other reasons, proper block matching was achieved. In effect, the selected temporal mode defines the processing (e.g., thresholding) of a different number of subbands (e.g., L20, H20, etc.).

Having described the various temporal modes implemented in the VDN systems 200, attention is now directed to a determination of which temporal mode to implement. To determine TemporalMode, the SubbandSAD is computed (e.g., by the 2D transform module 304 and communicated to the temporal mode module 302) between the blocks bs(0:63, k) and bs(0:63, 1) for 0≤k≤3 (zero for k=1), which establishes the closeness of the match of co-located blocks of the inputted samples (from the matched frames), using the low-frequency structure of the blocks where the signal can mostly be expected to exceed noise. Explaining further, the determination of closeness of a given match may be obscured or skewed when the comparison involves noisy blocks. By rejecting noise, the level of fidelity of the comparison may be improved. In one embodiment, the VDN system 200c-1 effectively performs a power compaction (e.g., a forward transform, such as via DCT) of the blocks at issue, whereby most of the energy of a natural video scene are power compacted into a few, more significant coefficients (whereas noise is generally uniformly distributed in a scene). Then, a SAD is performed in the DCT domain between the significant few coefficients of the blocks under comparison (e.g., in a subband of the DCT, based on a predefined threshold subband SAD value, not of the entire 8×8 block), resulting in removal of a significant portion of the noise from the computation and hence providing a more accurate determination of matching.

Explaining further, in one embodiment, the subbandSAD is computed using the ten (10) lowest frequency elements of the 2D transformed blocks bs(0:9, 0:3) where the frequency order low-to-high follows the zig-zag scanning specified hereinbefore. In some embodiments, fewer or greater numbers of lowest frequency elements may be used. Accordingly, for this example embodiment, the SubbandSAD(k) is given by the following equation:

$$SubbandSAD(k) = \sum_{z=0}^{9} |bs(z, k) - bs(z, 1)|, \quad \text{Eq. (20)}$$

where 0≤k≤3, and SubbandSAD(1)=0.

Integer counts SubbandFWDCount4, SubbandBAKCount4 and SubbandCount8 may be defined as follows:

$$SubbandCountFWD4 = \sum_{k=1}^{3} SetToOneOrZero(SubbandSAD(k) < Tsubbandsad) \quad \text{Eq. (21a)}$$

$$SubbandCountBAK4 = \sum_{k=0}^{1} SetToOneOrZero(SubbandSAD(k) < Tsubbandsad) \quad \text{Eq. (21b)}$$

$$SubbandCount8 = \sum_{k=0}^{3} SetToOneOrZero(SubbandSAD(k) < Tsubbandsad) \quad \text{Eq. (21c)}$$

where the function SetToOneOrZero(x) equals 1 when it's argument evaluates to TRUE, and zero otherwise, and Tsubbandsad is a parameter. In effect, Eqns. 21a-21c are computed to determine how many of the blocks are under the subband SAD threshold, and hence determine the temporal mode to be implemented. For instance, referring to Eq. 21c, for MODE8, the DCT of b0+b1+b2+b3 should be close enough in the lower frequencies to the DCT of b4 (and likewise, the DCT of b5 and b6+7 should be close enough in the lower frequencies to b4). Note that k=0 to k=3 since there is b0+b1+b2+b3, b4 (though k=1 is meaningless since the subband SAD of b4 with itself is zero), b5, and b6+7.

In Eq. 21a, for FWD4, the closeness of b4 with b5 and b6+7 is evaluated, so the numbering for k goes from 1-3 (though should go from 2 to 3 since 1 is meaningless as explained above). In Eq. 21b, numbering for k goes from 0 to 1, since only the zeroth sample is checked (i.e., the b0+1+2+3 sample, and again, 1 is meaningless since b4 always matches itself).

Accordingly, using SubbandCountFWD4, SubbandCountBAK4, and SubbandCount8, TemporalMode is set as follows:

```
If SubbandCount8 == 4, then TemporalMode = MODE8;
  else if SubbandCountFWD4 == 3 then TemporalMode = FWD4;
  else if SubbandCountBAK4 == 2 then TemporalMode = BAK4;
  else TemporalMode = SPATIAL.
```

Note that this scheme favors FWD4 over BAK4, but if MODE8 is not signaled, then only one of FWD4 or BAK4 can be satisfied anyway.

Thresholding is performed on the 2D or 3D transformed blocks during the overlapped block processing. For instance, when TemporalMode is set to SPATIAL, the 2D threshold module 306 is signaled, enabling the 2D threshold module 306 to perform 2D thresholding of the 2D transformed block bs(0:63, 1) from F4(t). According to this mode, no thresholding takes place on the three (3) blocks from MSUM0123(t), M5(t) or MSUM67(t) (i.e., there is no 2D thresholding on bs(0:63, 0), bs(0:63, 2), bs(0:63, 3)).

Figure 8:
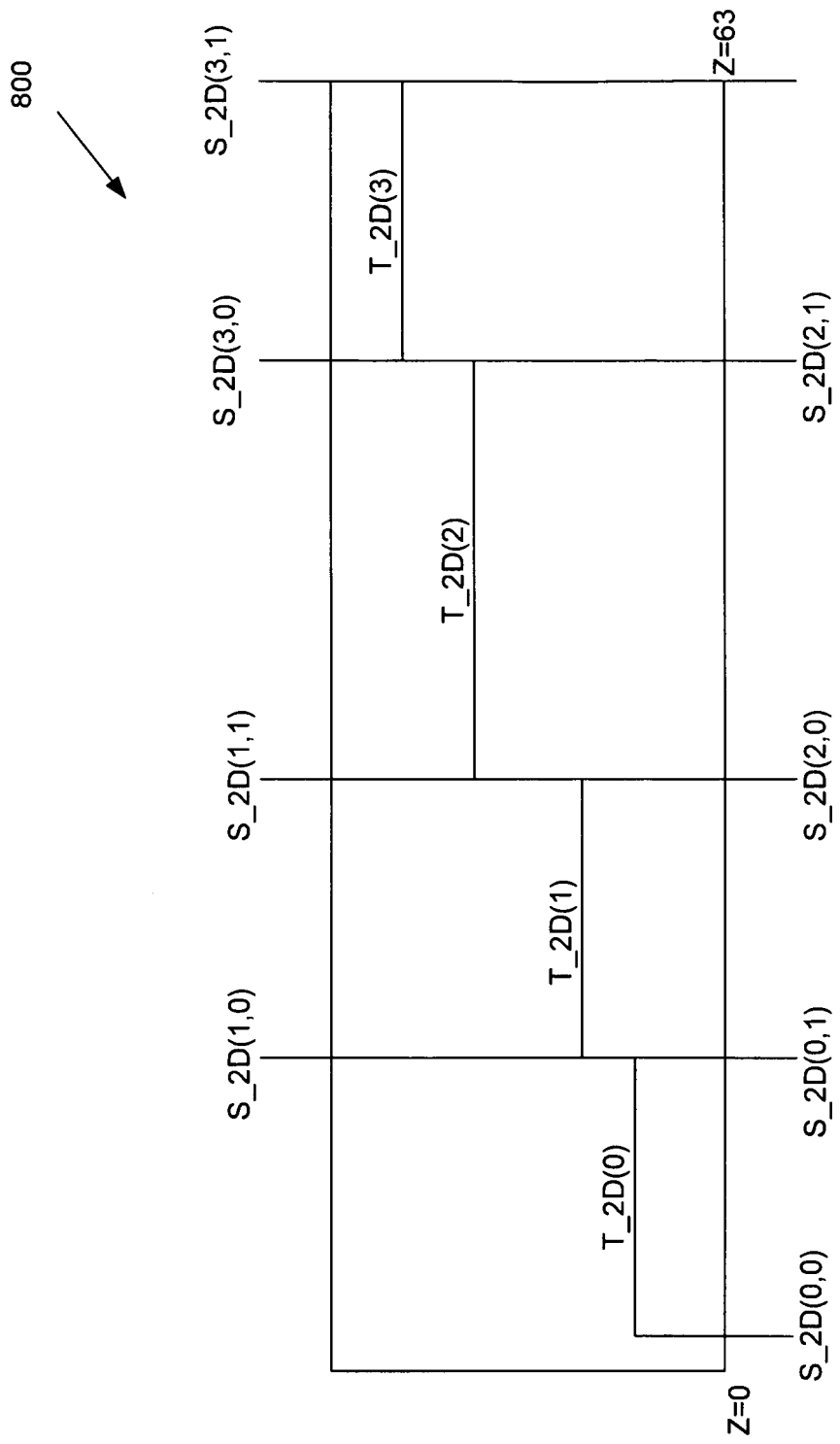
FIG. 8 is a schematic diagram that illustrates an example mechanism for thresholding.

Reference is made to FIG. 8, which is a schematic diagram 800 that illustrates one example embodiment of time-space frequency partitioning by thresholding vector, T_2D, and spatial index matrix, S_2D, each of which can be defined as follows:

T_2D(0:3): 4-element vector of thresholds
S_2D(0:3,2): 4×2 element matrix of spatial indices Together, T_2D and S_2D define the parameters used for thresholding the 2D blocks bs(0:63, 1). For only the 8×8 2D transformed block bs(0:63, 1), the thresholded block bst(0:63, 1) may be derived according to Eq. (22) below:

$$bst(z, t) = \begin{cases} 0 & \text{if } |bs(z, 1)| < T\_2D(j) \text{ and } S\_2D(j, 0) \le z \le S\_2D(j, 1) \\ bs(z, 1) & \text{otherwise} \end{cases} \quad \text{Eq. (22)}$$

for j=0 . . . 3.

In Eq. (22), T_2D(j) defines the threshold used for block 1, bs(0:63,1) from M4(t), over a span of spatial indices S_2D (j,0) to S_2D(j,1) for j=0 . . . 3. Equivalently stated, elements of bs(S_2D(j,0): S_2D(j,1),1) are thresholded by comparing the values of those elements to the threshold T_2D(j), and the values in bs(S_2D(j,0): S_2D(j,1),1) are set to zero when their absolute values are less than T_2D(j). Note that none of the matched frames MSUM0123(t), MSUM67(t) or M5(t) undergo 2D thresholding, only blocks from M4(t), bs(0:63, 1).

The spatial index matrix S_2D together with T_2D define a subset of coefficients in the zig-zag scanned spatial frequencies as illustrated in FIG. 8. The 2D space has been reduced to 1D by zig zag scanning.

Thresholding (at 3D threshold module 310) of the 3D transformed blocks bhaar(0:63,0:3) output from 1D transform module 308 is performed when TemporalMode is set to either FWD4, BAK4 or MODE8. Otherwise, when TemporalMode is set to SPATIAL, the output of 3D thresholding module 310 (e.g., bhaart(0:63,0:3)) is set to the input of the 3D thresholding module 310 (e.g., input equals bhaar(0:63, 0:3)) without modification. The 3D thresholding module 310 uses threshold vectors T_3D(j) and spatial index matrix S_3D(j,0:1) defined hereinabove in 2D thresholding 306, except using eight (8) thresholds so 0≤j<8.

An additional threshold vector TSUB(j,0:1) is needed for 3D thresholding 310, which defines the range of temporal subbands for each j. For example, TSUB(0,0)=0 with TSUB (0,1)=1 along with T_3D(0)=100 and S_3D(0,0)=0 and S_3D(0,1)=32 indicates that for j=0, 3D thresholding with the threshold of 100 is used across Haar subbands L20 and H20 and spatial frequencies 0 to 32.

Thresholding 310 of the 3D blocks is followed identically to the 2D thresholding 306 case following Eq. (22), but substituting T_3D and S_3D for T_2D and S_2D. For 3D thresholding 310, unlike 2D, all four (4) blocks bhaar(0:63, 0:3) are thresholded.

For MODE8, all Haar subbands are thresholded. For FWD4 and BAK4, only a subset of the Haar subbands is thresholded. The following specifies which subbands are thresholded according to TemporalMode:

If TemporalMode==MODE8 threshold [L20, H20, H02, H11] Haar Subbands

If TemporalMode==FWD4 threshold [H20, H02, H11] Haar Subbands

If TemporalMode==BAK4 threshold [L20, H20] Haar Subbands

Having described example embodiments of thresholding in VDN systems, attention is again directed to FIG. 3 and inverse transform and output processing. Specifically, inverse transforms include the inverse 1D transform 312 (e.g., Haar) followed by the inverse 2D transform (e.g., AVC integer DCT), both described hereinabove. It should be understood by one having ordinary skill in the art that other types of transforms may be used for both dimension, or a mix of different types of transforms different than the Haar/AVC integer combination described herein in some embodiments. For a 1D Haar transform, the inverse transform proceeds as shown in FIG. 6D and explained above.

The final denoised frame of FD4($t$) using the merged accumulation buffers is specified in Eq. (23) as follows:

$$FD4(i, j) = \frac{A(i, j)}{W(i, j)} \qquad \text{Eq. (23)}$$

For uniform weighting where w(i,j)=1 for all overlapped blocks, Eq. (23) amounts to a simple divide by 16 (for step size=2). However, if selectively omitting blocks, then Eq. (23) amounts to division by a number $1 \leq W(i,j) \leq 16$. After the 2D inverse transform 314 follows the 1D inverse transform 312, the block bd(i,j,1) represents the denoised block of F4($t$). This denoised block is accumulated (added into) in the A4($t$) accumulation buffer(s) 360 (e.g., accumulates the denoised estimates via repeated loops back to the 2D transform module 304 to index or shift in pixels to repeat the processing 350 for a given reference frame), and then output via normalization block 370.

Figure 9:
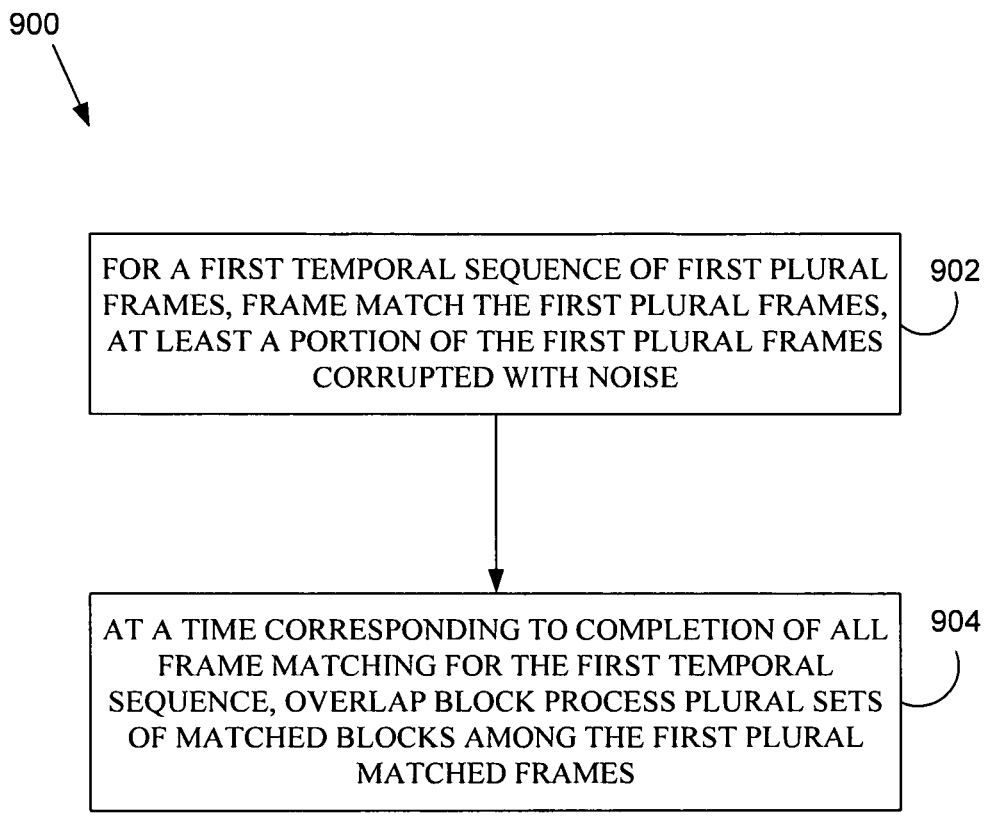
FIG. 9 is a flow diagram that illustrates an example method embodiment for decoupled frame matching and overlapped block processing.

Having described various embodiments of VDN systems 200, it should be appreciated that one method embodiment 900, implemented in one embodiment by the logic of the VDN system 200c-1 (FIG. 3) and shown in FIG. 9, comprises for a first temporal sequence of first plural frames, frame matching the first plural frames, at least a portion of the first plural frames corrupted with noise (902), at a time corresponding to completion of all frame matching for the first temporal sequence, overlap block processing plural sets of matched blocks among the first plural matched frames (904).

Figure 10A:
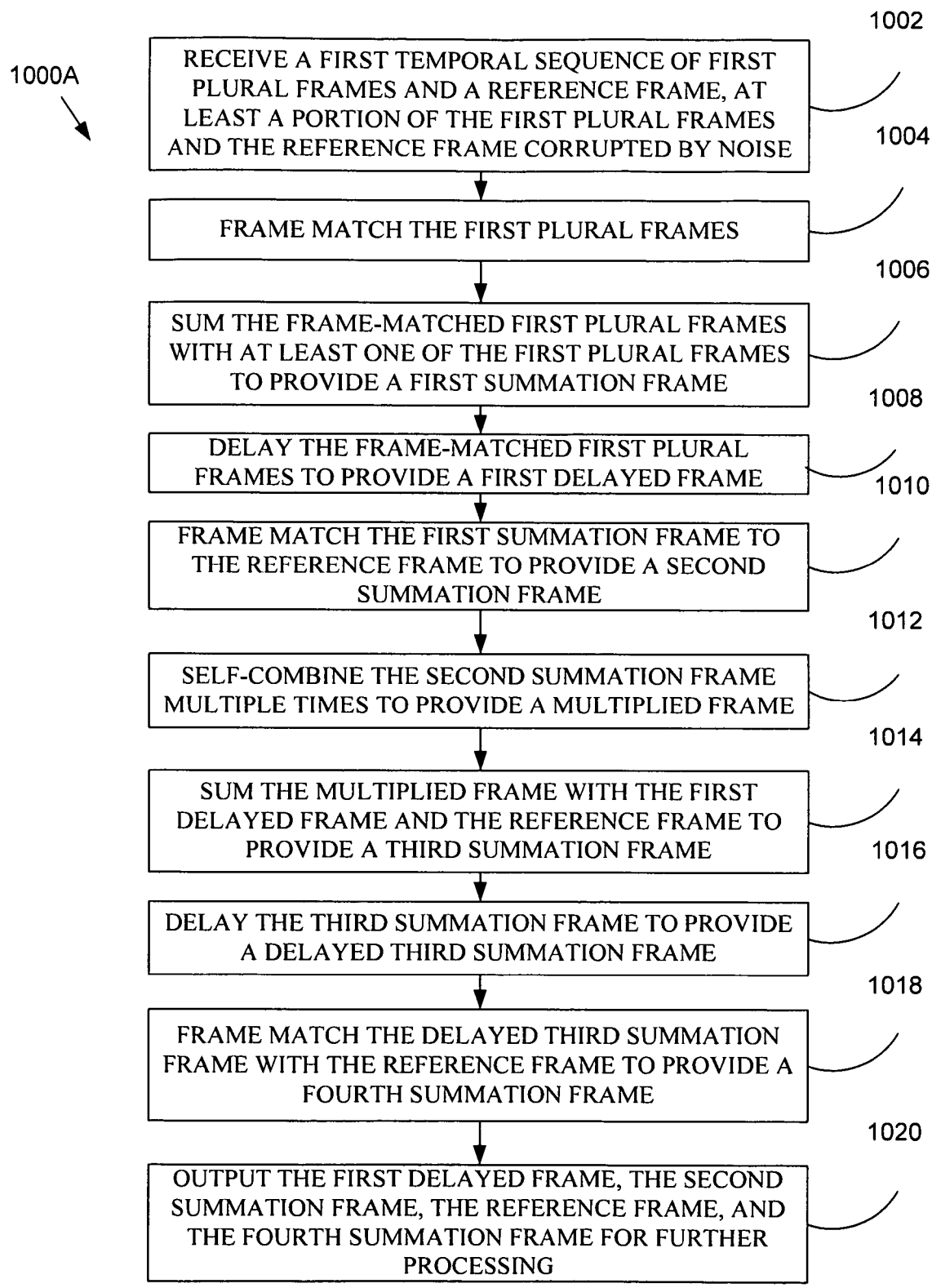
FIGS. 10A-10B are flow diagrams that illustrate example method embodiments for frame matching.

Another method embodiment 1000a, shown in FIG. 10A and implemented in one embodiment by frame alignment module 310a (FIG. 4A), comprises receiving a first temporal sequence of first plural frames and a reference frame, at least a portion of the first plural frames and the reference frame corrupted by noise (1002), frame matching the first plural frames (1004), summing the frame-matched first plural frames with at least one of the first plural frames to provide a first summation frame (1006), delaying the frame-matched first plural frames to provide a first delayed frame (1008), frame matching the first summation frame to the reference frame to provide a second summation frame (1010), self-combining the second summation frame multiple times to provide a multiplied frame (1012), summing the multiplied frame with the first delayed frame and the reference frame to provide a third summation frame (1014), delaying the third summation frame to provide a delayed third summation frame (1016), frame matching the delayed third summation frame with the reference frame to provide a fourth summation frame (1018), and outputting the first delayed frame, the second summation frame, the reference frame, and the fourth summation frame for further processing (1020).

Figure 10B:
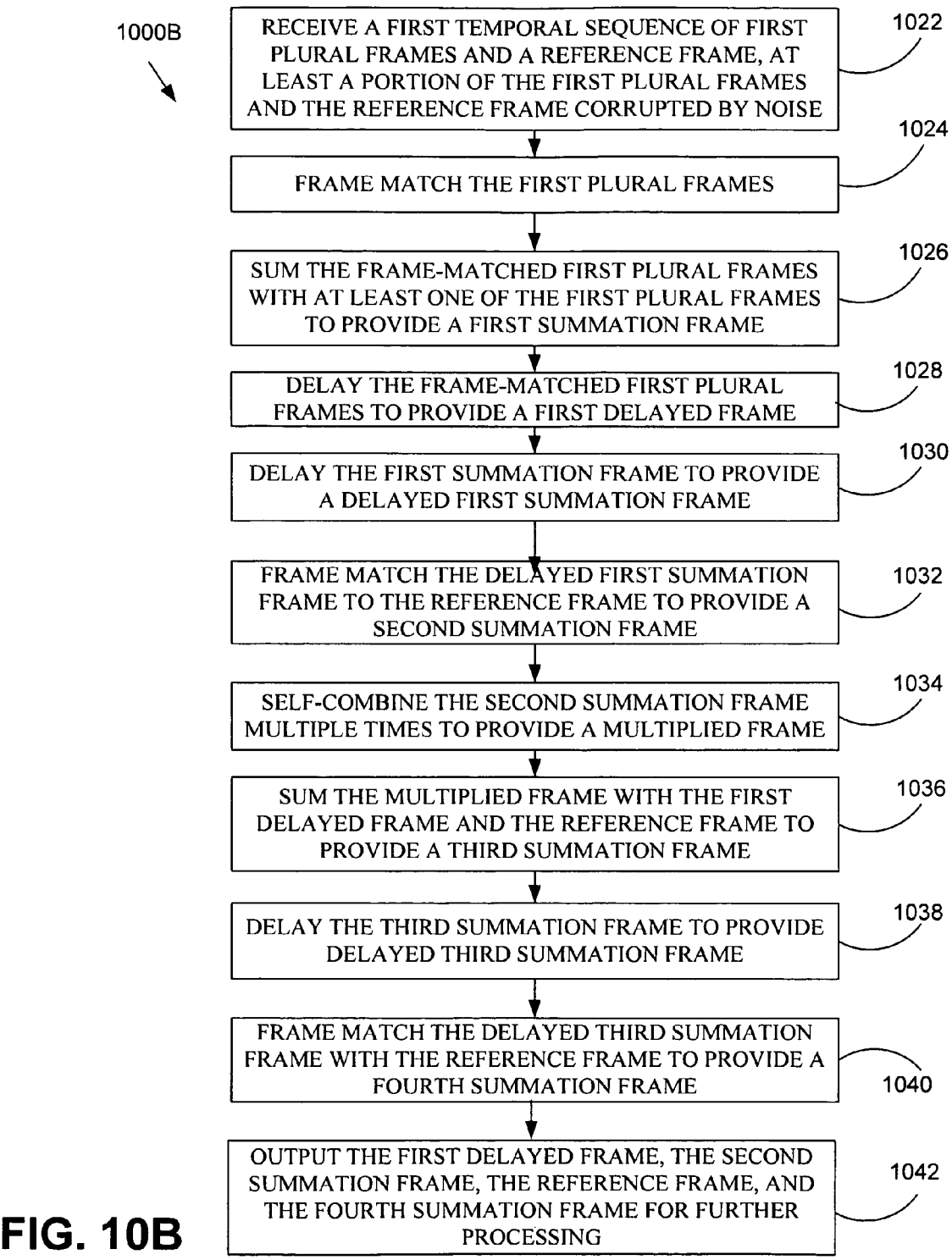

Another method embodiment 1000b, shown in FIG. 10B and implemented in one embodiment by frame alignment module 310b (FIG. 4B), comprises receiving a first temporal sequence of first plural frames and a reference frame, at least a portion of the first plural frames and the reference frame corrupted by noise (1022); frame matching the first plural frames (1024); summing the frame-matched first plural frames with at least one of the first plural frames to provide a first summation frame (1026); delaying the frame-matched first plural frames to provide a first delayed frame (1028); delaying the first summation frame to provide a delayed first summation frame (1030); frame matching the delayed first summation frame to the reference frame to provide a second summation frame (1032); self-combining the second summation frame multiple times to provide a multiplied frame (1034); summing the multiplied frame with the first delayed frame and the reference frame to provide a third summation frame (1036); delaying the third summation frame to provide delayed third summation frame (1038); frame matching the delayed third summation frame with the reference frame to provide a fourth summation frame (1040); and outputting the first delayed frame, the second summation frame, the reference frame, and the fourth summation frame for further processing (1042).

Figure 11:
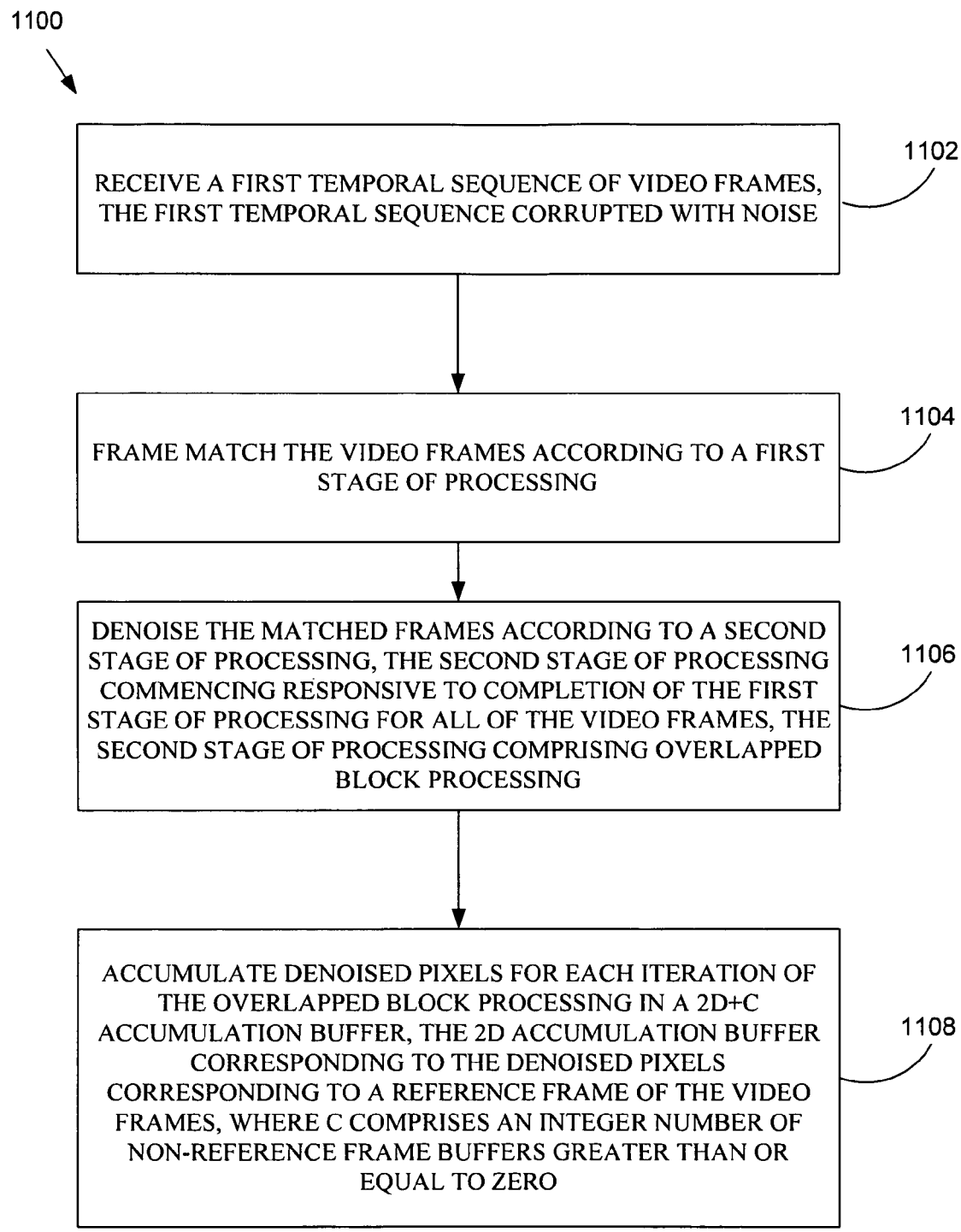
FIG. 11 is a flow diagram that illustrates an example method embodiment for frame matching and video denoising that includes various embodiments of accumulation buffer usage.

Another method embodiment 1100, shown in FIG. 11 and implemented in one embodiment by VDN system 200 corresponding to FIGS. 2A-2C and FIG. 3, comprises receiving a first temporal sequence of video frames, the first temporal sequence corrupted with noise (1102); frame matching the video frames according to a first stage of processing (1104); denoising the matched frames according to a second stage of processing, the second stage of processing commencing responsive to completion of the first stage of processing for all of the video frames, the second stage of processing comprising overlapped block processing (1106); and wherein denoising further comprises accumulating denoised pixels for each iteration of the overlapped block processing in a 2D+c accumulation buffer, the 2D accumulation buffer corresponding to the denoised pixels corresponding to a reference frame of the video frames, where c comprises an integer number of non-reference frame buffers greater than or equal to zero (1108).

Figure 12A:
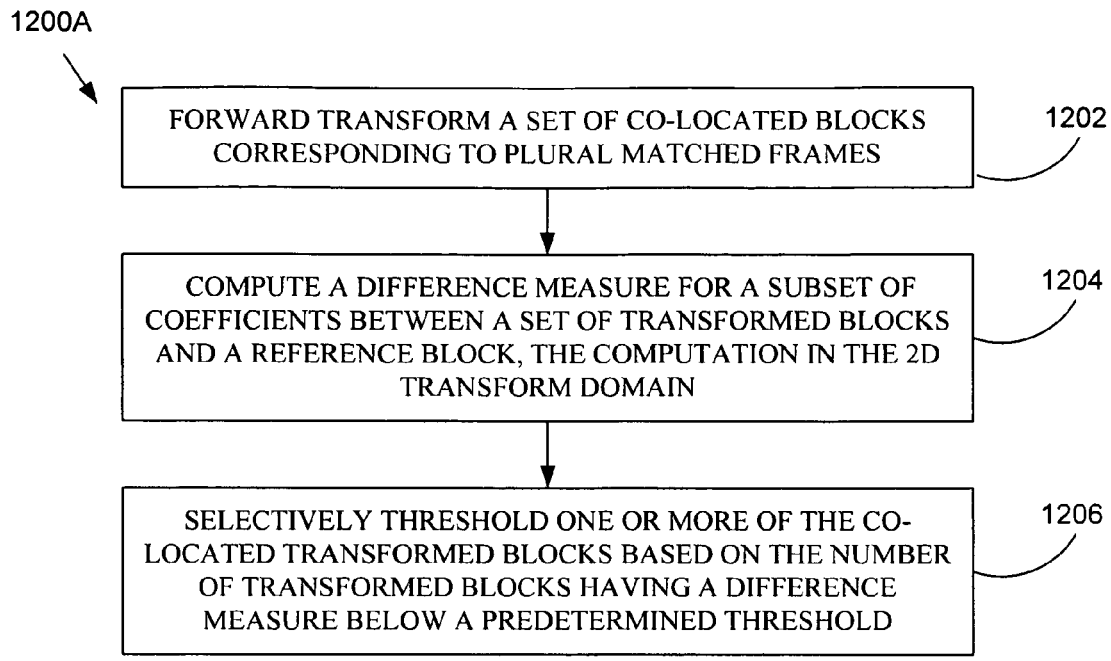
FIGS. 12A-12B are flow diagrams that illustrate example method embodiments for determining noise thresholding mechanisms.

Another method embodiment 1200a, shown in FIG. 12A and implemented in one embodiment by the overlapped block processing module 350 (FIG. 3), comprises forward transforming a set of co-located blocks corresponding to plural matched frames (1202); computing a difference measure for a subset of coefficients between a set of transformed blocks and a reference block, the computation in the 2D transform domain (1204); and selectively thresholding one or more of the co-located transformed blocks based on the number of transformed blocks having a difference measure below a predetermined threshold (1206).

Figure 12B:
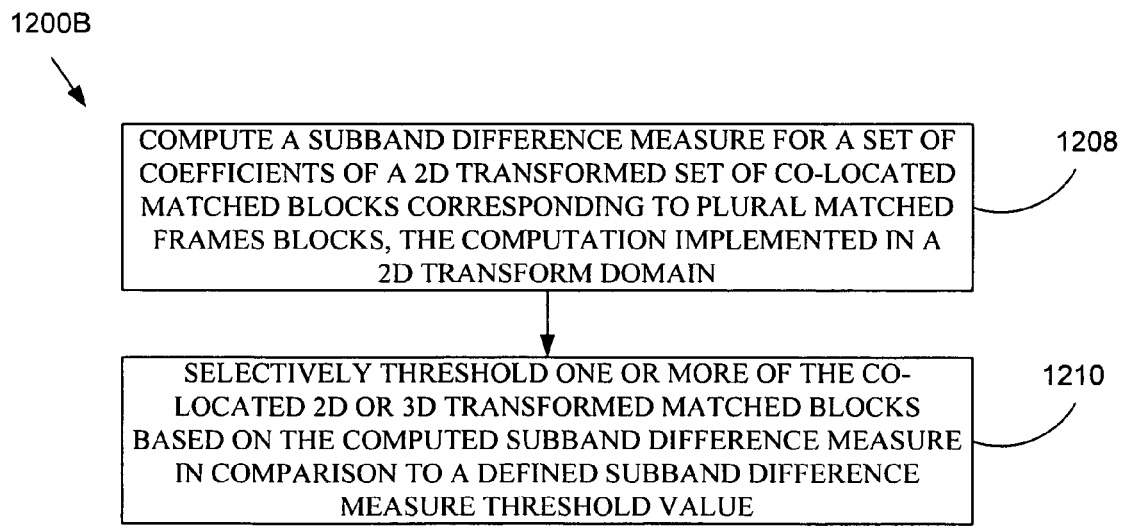

Another method embodiment 1200b, shown in FIG. 12B and implemented in one embodiment by the overlapped block processing module 350 (FIG. 3), comprises computing a subband difference measure for a set of coefficients of a 2D transformed set of co-located matched blocks corresponding to plural matched frames blocks, the computation implemented in a 2D transform domain (1208); and selectively thresholding one or more of the co-located 2D or 3D transformed matched blocks based on the computed subband difference measure in comparison to a defined subband difference measure threshold value (1210).

Figure 13:
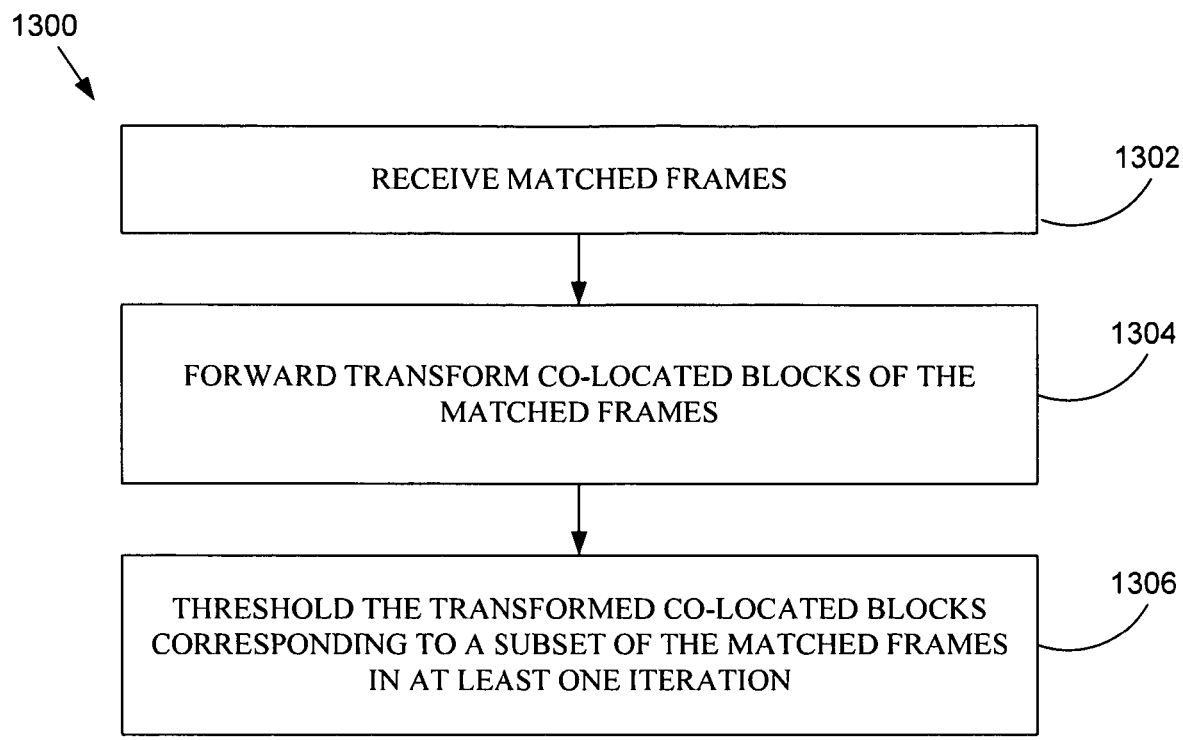
FIG. 13 is a flow diagram that illustrates an example method embodiment for adaptive thresholding in video denoising.

Another method embodiment 1300, shown in FIG. 13 and implemented in one embodiment by the overlapped block processing module 350 (FIG. 3), comprises receiving matched frames (1302); forward transforming co-located blocks of the matched frames (1304); and thresholding the transformed co-located blocks corresponding to a subset of the matched frames in at least one iteration (1306).

Figure 14:
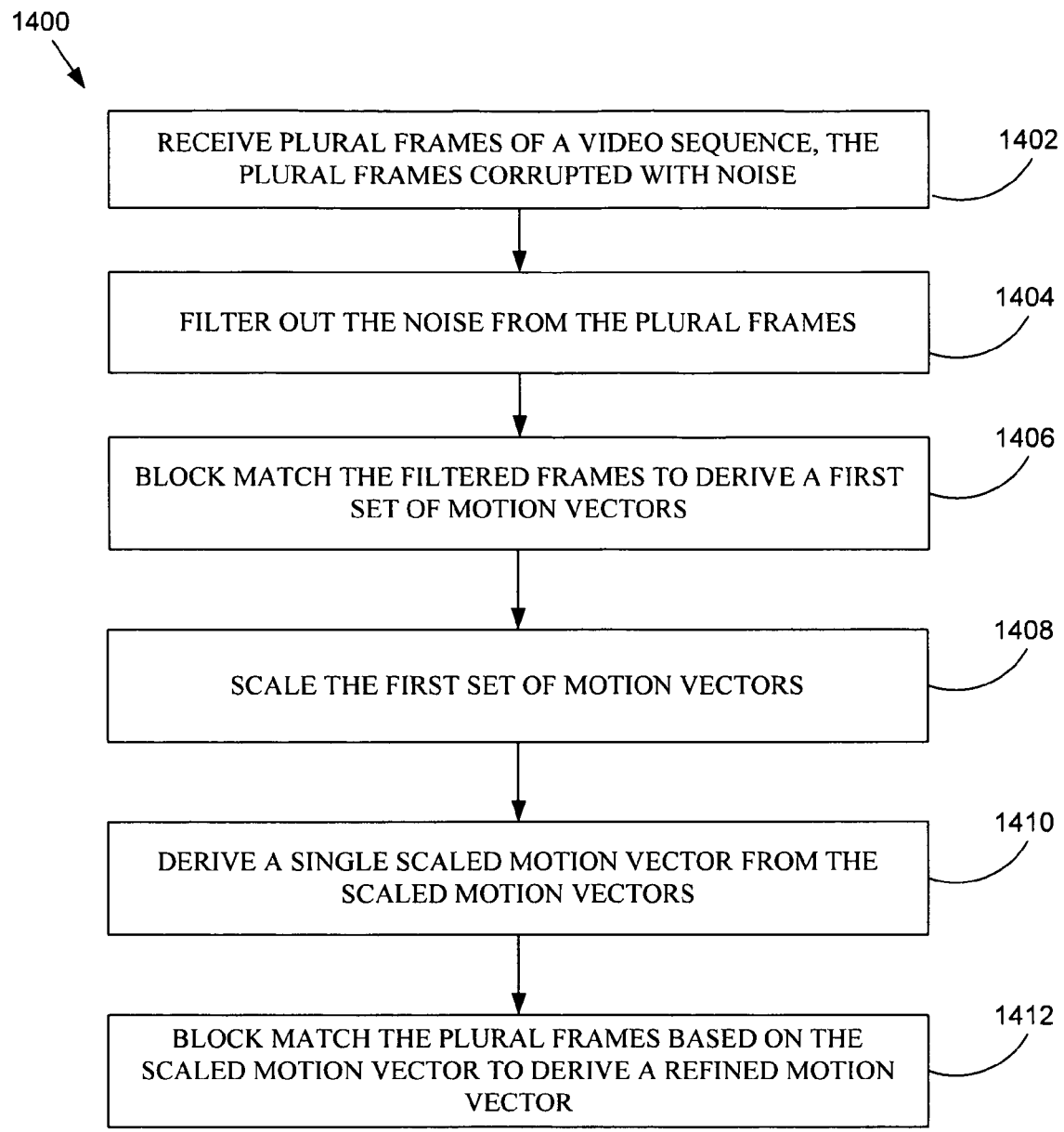
FIG. 14 is a flow diagram that illustrates an example method embodiment for filtered and unfiltered-based motion estimation.

Another method embodiment 1400, shown in FIG. 14 and implemented in one embodiment by the frame matching module 402 (FIG. 5) comprises receiving plural frames of a video sequence, the plural frames corrupted with noise (1402); filtering out the noise from the plural frames (1404); block matching the filtered frames to derive a first set of motion vectors (1406); scaling the first set of motion vectors (1408); deriving a single scaled motion vector from the scaled motion vectors (1410); and block matching the plural frames based on the scaled motion vector to derive a refined motion vector (1410).

Any process descriptions or blocks in flow charts or flow diagrams should be understood as representing modules, segments, or portions of code which include one or more executable instructions for implementing specific logical functions or steps in the process, and alternate implementations are included within the scope of the present disclosure in which functions may be executed out of order from that shown or discussed, including substantially concurrently or in reverse order, depending on the functionality involved, as would be understood by those reasonably skilled in the art. In some embodiments, steps of a process identified in FIGS. 9-14 using separate boxes can be combined. Further, the various steps in the flow diagrams illustrated in conjunction with the present disclosure are not limited to the architectures described above in association with the description for the flow diagram (as implemented in or by a particular module or logic) nor are the steps limited to the example embodiments described in the specification and associated with the figures of the present disclosure. In some embodiments, one or more steps may be added to one or more of the methods described in FIGS. 9-14, either in the beginning, end, and/or as intervening steps.

It should be emphasized that the above-described embodiments of the present disclosure are merely possible examples of implementations, merely set forth for a clear understanding of the principles of the VDN systems and methods. Many variations and modifications may be made to the above-described embodiment(s) without departing substantially from the spirit and principles of the disclosure. Although all such modifications and variations are intended to be included herein within the scope of this disclosure and protected by the following claims, the following claims are not necessarily limited to the particular embodiments set out in the description.

What is claimed is:

1. A computer-implemented method, comprising:
forward transforming a set of co-located blocks corresponding to plural matched frames, wherein forward transforming the co-located blocks comprises determining a step size for processing pixels within the matched frames, the step size being correlated with a quantity of the pixels in each block of the matched frames, wherein the plural matched frames are determined by frame matching, and wherein frame matching comprises collapsing a predetermined number of frames into a summations frame FSUM, wherein FSUM $$FSUM(t-4) = \sum_{j=4}^{7} Mj(t-4) \, FSUM(t-4) = \sum_{j=4}^{7} Mj(t-4);$$

computing a difference measure for a subset of coefficients between a set of transformed blocks and a reference block, the computation in a two-dimensional (2D) transform domain; and selectively thresholding, in accordance with a temporal mode, one or more of the co-located transformed blocks based on the number of transformed blocks having a difference measure below a predetermined threshold.

2. The method of claim 1, wherein forward transforming comprises 2D transforming.

3. The method of claim 1, wherein the subset of coefficients corresponds to the lower frequency components of the 2D transform, zig-zag scanned to one-dimension (1D).

4. The method of claim 1, wherein the subset of coefficients corresponds to a defined quantity of the lowest frequency elements of the transformed blocks.

5. The method of claim 1, wherein the subset of coefficients corresponds to a subset of the coefficients of the 2D transformed blocks.

6. The method of claim 1, further comprising communicating the difference measure for the subset of coefficients of the transformed blocks for determination of the temporal mode, the determination based on a comparison of the subset with a predefined threshold subband difference measure value, the temporal mode used to determine which of the co-located transformed blocks to threshold.

7. The method of claim 1, wherein computing comprises rejecting noise not belonging to the subset.

8. The method of claim 1, wherein selectively thresholding consists of three-dimensional (3D) thresholding co-located blocks temporally subsequent to a matched reference frame of the matched frames.

9. The method of claim 1, wherein selectively thresholding consists of three-dimensional (3D) thresholding co-located blocks temporally previous to a matched reference frame of the matched frames.

10. The method of claim 1, wherein selectively thresholding consists of 2D thresholding the co-located block of a matched reference frame of the matched frames.

11. The method of claim 1, wherein selectively thresholding consists of three-dimensional dimensional (3D) thresholding co-located blocks corresponding to all of the matched frames.

12. A system, comprising:
transform logic configured to:
forward transform a set of co-located blocks corresponding to plural matched frames, wherein forward transforming the co-located blocks comprises determining a step size for processing pixels within the matched frames, the step size being correlated with a quantity of the pixels in each block of the matched frames, wherein the plural matched frames are determined by frame matching, and wherein frame matching comprises collapsing a predetermined number of frames into a summations frame FSUM, wherein FSUM $$FSUM(t-4) = \sum_{j=4}^{7} Mj(t-4) FSUM(t-4) = \sum_{j=4}^{7} Mj(t-4);$$

compute a difference measure in a transform domain for a subset of coefficients corresponding to the transformed blocks, the computation being associated with the rejection of noise; and threshold logic configured to selectively threshold, in accordance with a temporal mode, one or more of the co-located blocks based on the number of transformed blocks having a computed difference measure values below a predetermined threshold.

13. The system of claim 12, wherein the transform logic is configured to implement two-dimensional (2D) transforming.

14. The system of claim 12, wherein the subset of coefficients corresponds to a defined quantity of the lowest frequency elements of two-dimensional (2D) transformed blocks, the lowest frequency elements ordered by zig-zag scanning the 2D transformed blocks to one-dimension (1D).

15. The system of claim 12, further comprising temporal mode logic configured to receive the difference measure for the subset from the transform logic and determine the temporal mode, the determination based on a comparison of the subset with a predefined threshold subband difference measure value, the temporal mode used to determine which of the co-located transformed blocks to threshold.

16. The system of claim 15, wherein the threshold logic is configured to selectively threshold by three-dimensional (3D) thresholding, exclusively, co-located 3D transformed matched blocks temporally subsequent to a matched reference frame of the matched frames, the thresholding responsive to signalling from the temporal mode logic.

17. The system of claim 15, wherein the threshold logic is configured to selectively threshold by three-dimensional (3D) thresholding, exclusively, co-located 3D transformed matched blocks temporally previous to a matched reference frame of the matched frames, the thresholding responsive to signalling from the temporal mode logic.

18. The system of claim 15, wherein the threshold logic is configured to selectively threshold by two-dimensional (2D) thresholding, exclusively, a block of a matched reference frame of the matched frames, the thresholding responsive to signalling from the temporal mode logic.

19. The system of claim 15, wherein the threshold logic is further configured to selectively threshold by three-dimensional (3D) thresholding co-located 3D transformed matched blocks corresponding to all of the matched frames, the thresholding responsive to signalling from the temporal mode logic.

20. A computer-implemented method, comprising:

computing a difference measure for a set of coefficients of a two-dimensional (2D) transformed set of co-located matched blocks corresponding to plural matched frames blocks, the computation implemented in a 2D transform domain, a pixel size of each block of the co-located blocks being determined by a step-size used in processing pixels in the matched frames blocks, wherein the plural matched frames are determined by frame matching, and wherein frame matching comprises collapsing a predetermined number of frames into a summations frame FSUM, wherein FSUM $$FSUM(t-4) = \sum_{j=4}^{7} Mj(t-4) FSUM(t-4) = \sum_{j=4}^{7} Mj(t-4);$$

and selectively thresholding, in accordance with a temporal mode, one or more of the co-located 2D or three-dimensional (3D) transformed matched blocks based on the computed subband difference measure in comparison to a defined subband difference measure threshold value and based on the number of transformed blocks having a subband difference measure value below a predetermined threshold.

* * * * *